(12) United States Patent
Washizawa

(10) Patent No.: US 6,493,031 B1
(45) Date of Patent: *Dec. 10, 2002

(54) VISUAL INFORMATION PROCESSING METHOD AND APPARATUS FOR EXTRACTING FEATURE QUANTITIES FROM A TWO-DIMENSIONAL IMAGE SIGNAL

(75) Inventor: Teruyoshi Washizawa, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/623,224

(22) Filed: Mar. 28, 1996

(30) Foreign Application Priority Data

Mar. 31, 1995 (JP) .............................................. 7-076514
Mar. 26, 1996 (JP) .............................................. 8-070011

(51) Int. Cl.$^7$ .............................................. H04N 5/225
(52) U.S. Cl. .................................... 348/335; 348/207.1
(58) Field of Search ............................... 348/208, 345, 348/100, 36, 39, 699, 700, 169, 170, 335, 358, 222.1, 207.99

(56) References Cited

U.S. PATENT DOCUMENTS

| | | | | |
|---|---|---|---|---|
| 4,227,212 A | * | 10/1980 | Woolfsun et al. | 348/170 |
| 4,346,405 A | * | 8/1982 | Yoda et al. | 385/105 |
| 4,849,813 A | * | 7/1989 | Hirao et al. | 358/137 |
| 5,031,049 A | * | 7/1991 | Tagana et al. | 348/352 |
| 5,073,868 A | * | 12/1991 | Tada | 395/112 |
| 5,103,305 A | * | 4/1992 | Watanabe | 358/105 |
| 5,267,034 A | * | 11/1993 | Miyatake et al. | 348/208 |
| 5,508,734 A | * | 4/1996 | Baker et al. | 348/36 |
| 5,539,491 A | * | 7/1996 | Toshikatsu et al. | 354/400 |
| 5,581,309 A | * | 12/1996 | Okina et al. | 348/699 |
| 5,682,197 A | * | 10/1997 | Moghadam et al. | 348/36 |
| 5,686,957 A | * | 11/1997 | Baker | 348/36 |
| 5,812,193 A | * | 9/1998 | Tomitaka et al. | 348/169 |
| 5,990,941 A | * | 11/1999 | Jackson et al. | 348/36 |

FOREIGN PATENT DOCUMENTS

| | | | | |
|---|---|---|---|---|
| EP | 0 458 373 A | | 11/1991 | |
| EP | 0 458373 A | * | 11/1991 | .......... H04N/5/232 |
| EP | WO 92/21208 | | 11/1992 | |
| EP | 0 637 168 A | | 2/1995 | |
| EP | 0 637168 | * | 2/1995 | ............ H04N/5/32 |

OTHER PUBLICATIONS

Digest of Technical Papers of the International Conference on Consu Electronics (ICCE), Rosemont, Jun. 21–23, 1994, Institute of Electrical and Electronics Engineers, p. 268/269 XP000504047, Sekine et al., "Motion Vector Detecting System for Video Image Stabilizers," pp. 268–269.
Proceedings of the Asilomar Conference on Signals, Systems and Computers, Pacific Grove, Nov. 4–6, 1991, vol. 2 of 2, Nov. 4, 1991, Chen R R, pp. 1057–1061, XP000314508 Qinfen Zheng et al., "Balloon Motion Estimation Using Two Frames" p. 1058, col. 1, line 21—p. 1060, col. 1, line 24.
Communication from European Patent Office for Application No. 96 302 245.4–2202 dated Feb. 6, 2002.

* cited by examiner

*Primary Examiner*—Tuan Ho
(74) *Attorney, Agent, or Firm*—Morgan & Finnegan, L.L.P.

(57) ABSTRACT

A visual information processing method and apparatus for acquiring and processing visual information by successively changing the amount of visual information entered with regard to a desired target position in space, reading image data at each position at which an image is formed and storing the image data in correspondence with the target position in space. The amount of visual information is successively changed by changing the image-forming position corresponding to the target position in space by moving of the optic axis of a wide-angle lens. The visual information is successively altered by zooming or by filtering which relies upon a two-dimensional filter.

7 Claims, 17 Drawing Sheets

VISUAL INFORMATION PROCESSING METHOD AND APPARATUS FOR EXTRACTING FEATURE QUANTITIES FROM A TWO-DIMENSIONAL IMAGE SIGNAL

BACKGROUND OF THE INVENTION

This invention relates to a visual information processing method and apparatus, particularly a visual information processing method and apparatus capable of extracting feature quantities from a two-dimensional image signal and of encoding the signal.

A conventional image input unit uses an input system in which a coordinate transformation from a coordinate system in real space to coordinates on a sensor plane is linear. For example, there is the usual lens system employed in a video camera, namely a lens system which realizes an identity mapping, and a line sensor used in a scanner. If the spacing between the sensors of an array sensor is constant in such an input system, sampling data having the same resolution are obtained over the entire area covered by the array sensor. Accordingly, if the sampling frequency is high enough, an advantage is that the input data will contain enough information for processing to be executed continuously.

A system is available in which use is made of a wide-angle lens in order to a view a wide area at one time. This system implements a monotonous scale conversion of the type in which the image becomes smaller in size as distance from the optical axis of the lenses increases. The advantage of this system is that it is possible to view all of a hemisphere at one time.

An ordinary lens system equipped with an optic-axis control device and a wide-angle lens for viewing the entirety of a hemisphere at one time are used in combination as the visual-information input unit of a monitoring apparatus, self-propelled vehicle or self-controller robot, which require that visual information over a wide range be obtained at one time. The direction of the optic axis of the ordinary lens system is decided based upon coarse information of the surroundings obtained by the wide-angle lens. With a system of this kind, high-resolution visual information over a narrow range and low-resolution visual information of a wide range may be obtained simultaneously.

A panoramic input unit realized by rotating the array sensor also has been proposed in order to obtain high-resolution visual information covering a wide range. The system provides full-peripheral high-resolution data if a suitable amount of time is expended.

However, the examples of the prior art described above have the following drawbacks:

1. Absolutely no visual information regarding areas other than an area capable of being entered at one is obtained from an input system that relies upon fixed, uniform sampling.

2. The resolution of the periphery declines dramatically when an input is made through the intermediary of the wide-angle lens.

3. In a panoramic input unit, a certain fixed period of time is necessary to obtain high-resolution visual information of a wide area.

SUMMARY OF THE INVENTION

Accordingly, an object of the present invention is to provide a visual information processing method and apparatus for obtaining an appropriate amount of visual information at high speed.

Another object of the present invention is to provide a visual information processing method and apparatus whereby a multi-resolution approximation or multi-resolution space, which is effective as an expedient for expressing an image, is obtained through a simple arrangement.

In order to solve the problems of the prior art, the present invention provides a visual information processing method in a visual information processing apparatus for acquiring and processing visual information, characterized by successively changing visual information with regard to a desired spatial position, reading image data at each image-forming position and storing the image data in correspondence with the spatial position.

The visual information is successively changed by changing the image-forming position corresponding to the spatial position by moving of the optic axis of a lens. The lens is a wide-angle lens. Further, the visual information is successively altered by zooming. Further, the visual information is successively changed by filtering which relies upon a two-dimensional filter. Further, there are at least two spatial positions, image data at each image-forming position are read out in correspondence with each spatial position, and the image data are stored in correspondence with each spatial position. The method is further characterized by a step of detecting at least two above-mentioned spatial positions. The method is further characterized by a step of changing the read image data to image data of multi-resolution space corresponding to the spatial positions, or to a power spectrum.

The invention further provides a visual information processing apparatus for acquiring and processing visual information, characterized by comprising visual information changing means for changing obtained visual information with respect to a desired spatial position, and visual information memory means for reading image data at each image-forming position and storing the image data in correspondence with the spatial position.

The visual information changing means has optic-axis moving means for moving the optic axis of a lens. The lens is a wide-angle lens. Further, the visual information changing means has means for controlling zooming. Further, the visual information changing means has means for performing predetermined two-dimensional filtering. Further, there are two or more spatial positions, and the visual information changing means reads the changing image data in correspondence with each spatial position and stores the image data in correspondence with each spatial position. The method is further characterized by a step of detecting the plurality of spatial positions. The apparatus is further characterized by having position detecting means for detecting the plurality of spatial positions. The apparatus is further characterized by having visual information processing means for changing the read image data to image data of multi-resolution space corresponding to the spatial positions, or to a power spectrum.

Further, a visual information processing apparatus according to the present invention is characterized by comprising image input means which includes a wide-angle lens, autofocus means, rangefinding means and an array sensor, input-parameter control means for controlling an input parameter of the image input means, external memory means for storing image information that enters from the image input means, and calculating means which, on the basis of distance to an object obtained from the rangefinding means and a coordinate transformation equation of the wide-angle lens, calculates an input-parameter control quantity, which controls the input parameter, and timing at which the image information is recorded in external recording means.

The apparatus is further characterized by comprising two-dimensional filter means for subjecting an output image from the array sensor to more than one stage of filtering. The apparatus is further characterized by comprising extremum detecting means for detecting an extremum of a two-dimensional signal outputted by the array sensor or two-dimensional filter means, and extremum memory means for storing coordinates of the detected extremum.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

[First Embodiment]

Figure 1:
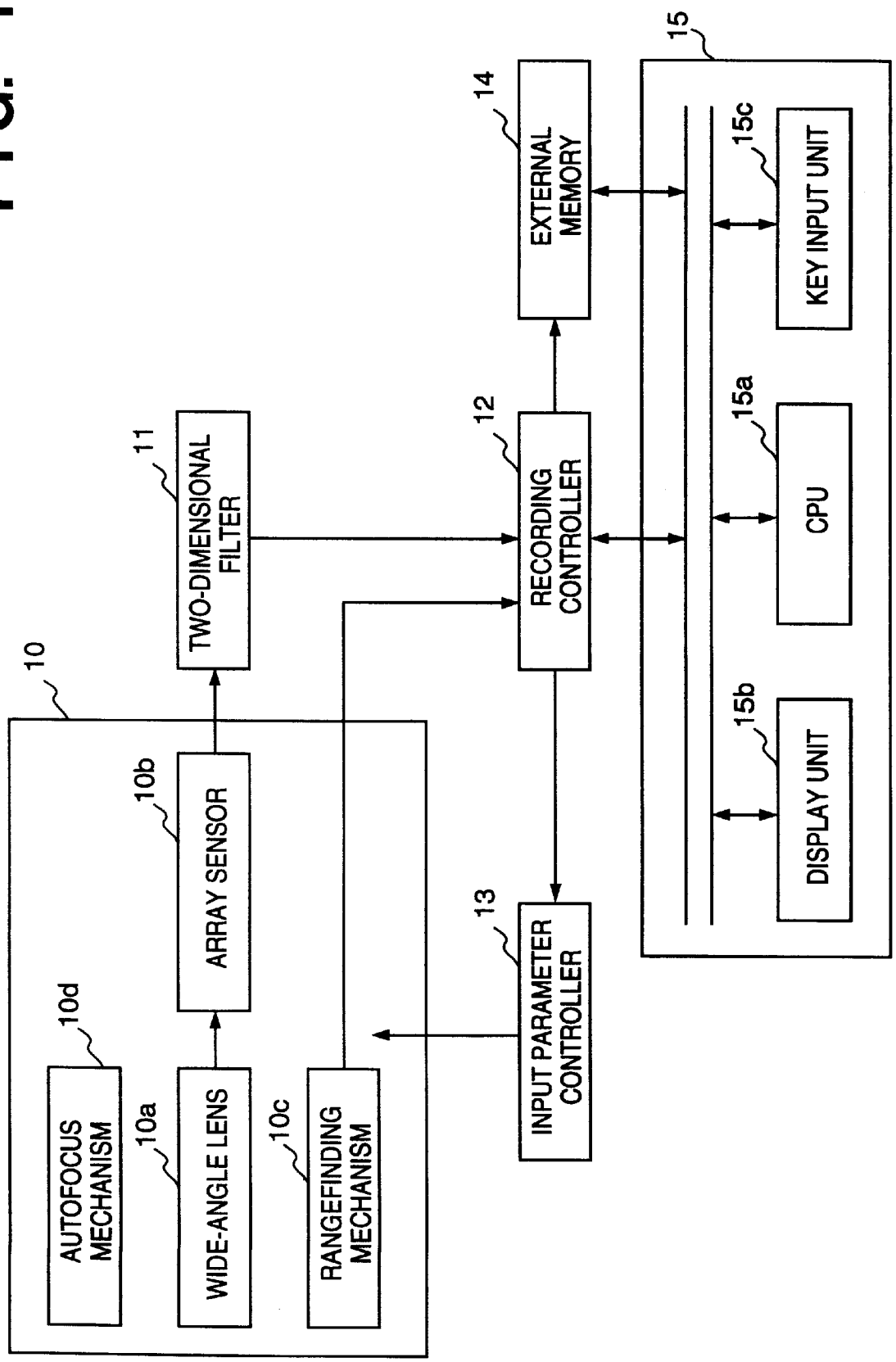
FIG. 1 is a block diagram illustrating an example of the construction of a visual information processing apparatus according to a first embodiment of the present invention.

FIG. 1 is a block diagram illustrating an example of the construction of a visual information processing apparatus according to a first embodiment of the present invention. The elements constituting this apparatus will now be described.

<Image Sensing Mechanism 10>

(Wide-angle Lens 10a)

Figure 2:
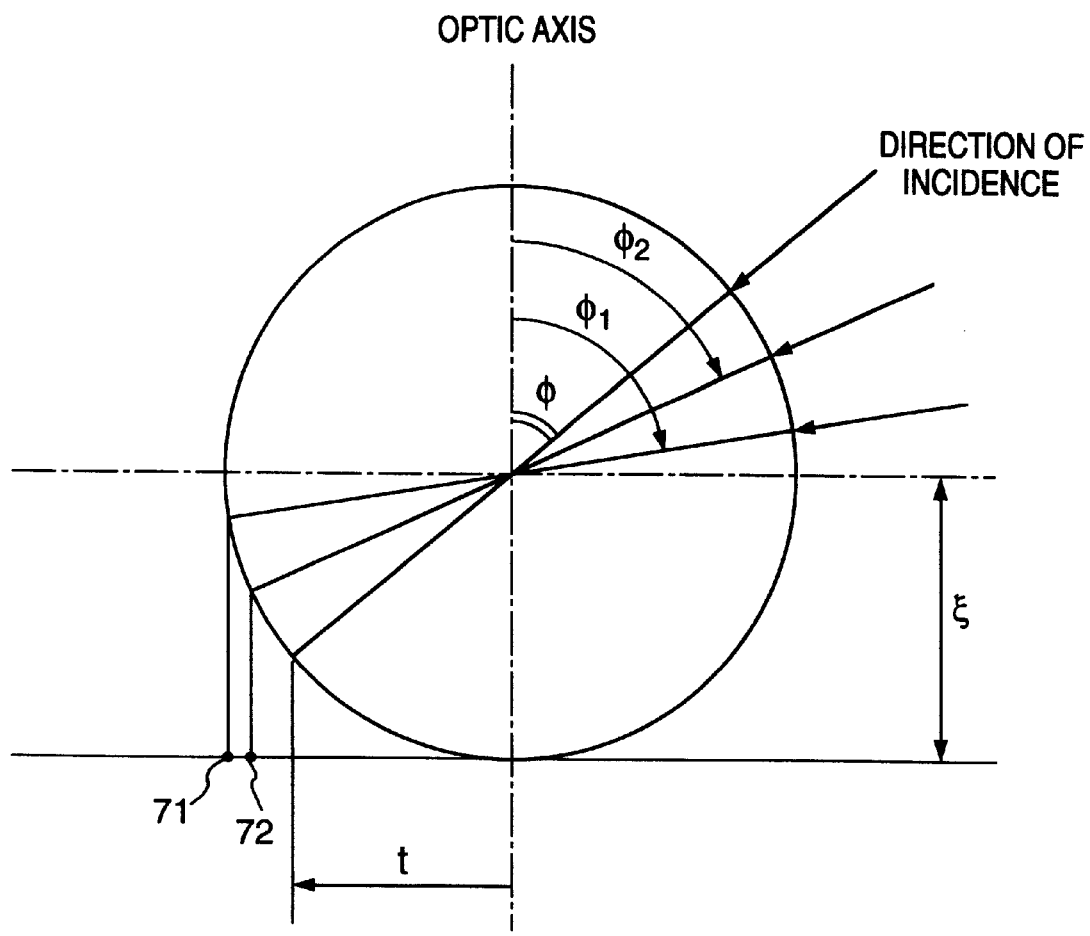
FIG. 2 is a diagram for describing a coordinate transformation performed by a wide-angle lens.

There are various types of wide-angle lenses. An orthogonal projection lens is used in this embodiment. Further, the optical system is symmetrical about an axis of rotation. Accordingly, the drawings and description below deal with the radial direction. (The direction of rotation is represented by θ.) A coordinate transformation performed by the wide-angle lens 10a is shown in FIG. 2. A radius t in a polar coordinate system after being transformed by the wide-angle lens 10a may be written as follows using focal length ξ and angle of incidence φ with respect to the optic axis:

$$t = \xi \sin(\phi) \tag{1}$$

This is the coordinate transformation performed by the orthogonal projection lens.

(Array Sensor 10b)

An array sensor 10b, which is a two-dimensional sensor comprising sensors arrayed in the form of a two-dimensional lattice, converts continuous spatial coordinates to discrete one. The output of a sensor whose index is m in the horizontal direction and n in the vertical direction is represented by $g_{m,n}$.

(Rangefinding Mechanism 10c and Autofocus Mechanism 10d)

A rangefinding mechanism 10c measures range to an object of interest, and an autofocus mechanism 10d achieves focusing at the range measured. These mechanisms are well known in camera technology.

(Two-dimensional Filter 11)

A two-dimensional filter 11 subjects the output signal of the array sensor 10b, namely the discrete two-dimensional image $\{g_{m,n}\}_{m,n}$, to the following digital filtering:

$$\overline{\omega}_{m,n} = \sum_{l=-L}^{L} \sum_{k=-K}^{K} h_{k,l} g_{m+k,n+1} \tag{2}$$

In a case where a multi-resolution approximation is implemented, a filter configuration having a low-pass (LP) characteristic is selected. In a case where wavelet space is implemented approximately, it will suffice if the filter is designed to have compact support in the spatial frequency domain.

For example, a $\nabla^2 G$ operator $$h_{k,l} = \frac{1}{8} \begin{bmatrix} -1 & -1 & -1 \\ -1 & 8 & -1 \\ -1 & -1 & -1 \end{bmatrix} \tag{3}$$

is used.

Further, if it is desired to obtain the orientation of an edge in each image, a discrete Gabor filter having a detection center frequency $\omega_p$ and a spatial constant $\gamma$ is applied. As a result, a jth filter output (counting from the optic axis) is as follows:

$$y_j(f) = \pi^{1/4}(\omega_p/\gamma)^{1/2}\sum_{k=-K}^{k=K}\exp\left(-\frac{1}{2}\left\{\frac{\omega_x(k-j)\Delta t}{\gamma}\right\}^2\right)\times \qquad (4)$$
$$\exp(i\omega_p(k-j)\Delta t)f(x)$$

The filter output for an image whose spatial frequency in the radial direction on the image plane is $\omega_x/2\pi$, namely $$f(x) = \exp\left(i\frac{\omega_x(k-j)\Delta t}{1-((k-j)\Delta t/(2\xi))^2}\right) \qquad (5)$$

is as follows:

$$y_j(f,\omega_x) = \pi^{1/4}(\omega_p/\gamma)^{1/2}\sum_{k=-K}^{k=K}\exp\left(-\frac{1}{2}\left\{\frac{\omega_x(k-j)\Delta t}{\gamma}\right\}^2\right)\times \qquad (6)$$
$$\exp\left(i\left\{\omega_p(k-j)\Delta t + \frac{\omega_x(k-j)\Delta t}{1-((k-j)\Delta t/(2\xi))^2}\right\}\right)$$

Figure 3:
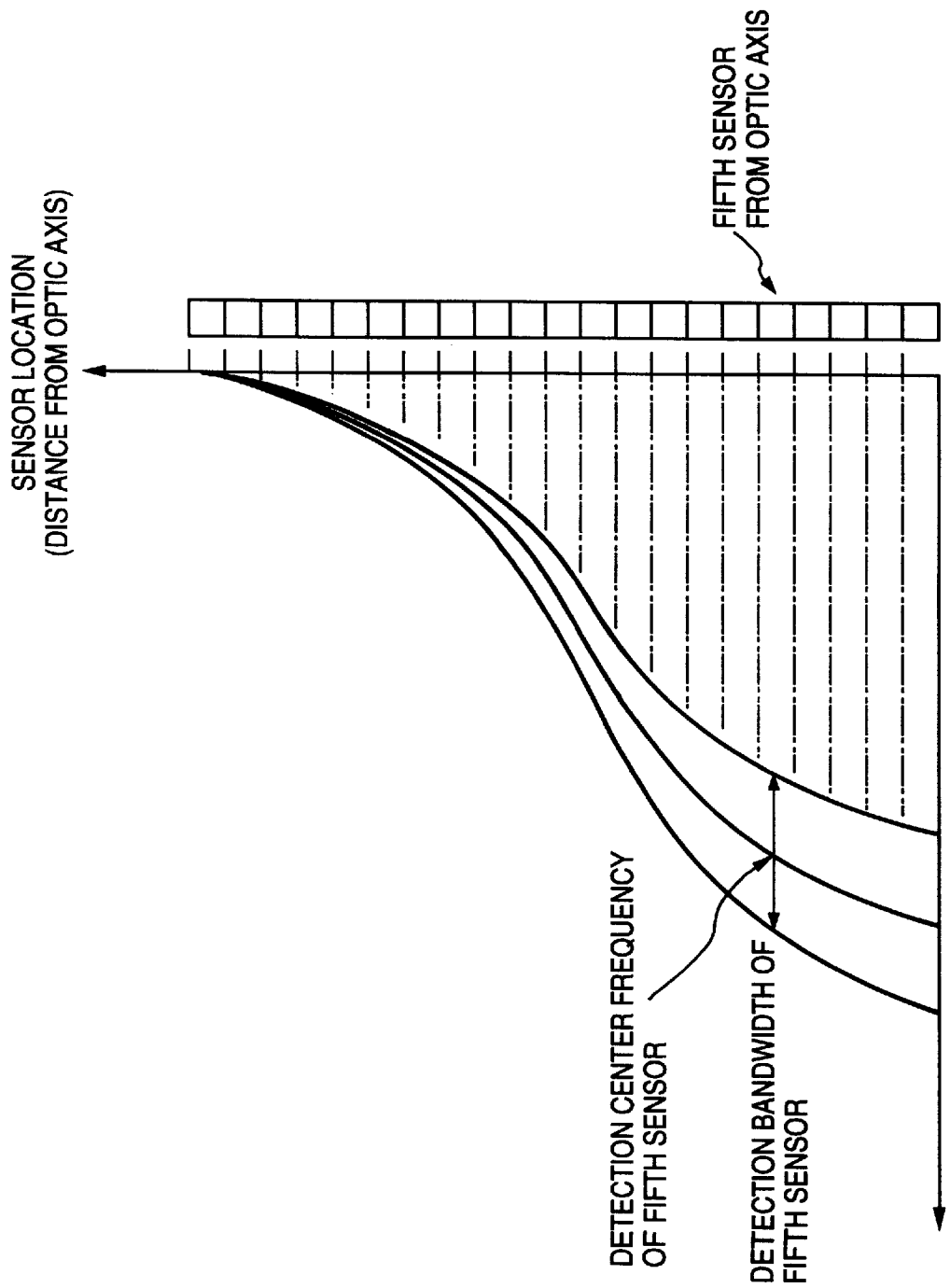
FIG. 3 is a diagram for describing spatial frequency sensed by a sensor.

FIG. 3 illustrates a frequency characteristic resulting from the wide-angle lens 10a and two-dimensional filter 11. (The lens 10a and filter 11 will also be referred to as a "wide-angle lens input system" below.) Distance from the optic axis of each sensor constituting the array sensor 10b is plotted along the vertical axis, and the (local) spatial frequency band sensed by each sensor is plotted along the horizontal axis. It will be understood from FIG. 3 that the center frequency sensed by the wide-angle lens input system decreases monotonously with displacement from the optic axis. Thus, it will be appreciated that this wide-angle lens input system senses components, which are less than the maximum frequency capable of being sensed by the system, in appropriate bandwidths.

More specifically, it will be understood that the output value of a sensor near the optic axis represents intensity on the higher side of frequency, as shown in FIG. 3. FIG. 3 illustrates the frequency band detected by the fifth sensor counting from the sensor situated on the optic axis. It will be appreciated that the frequency band detected by the 11th sensor is approximately half that detected by the fifth sensor.

<Input-parameter Controller 13>

An input-parameter controller 13 calculates the amount of movement of the wide-angle lens 10a, namely the angle in the vertical direction and the angle in the horizontal direction, and controls the movement of the optic axis (inclusive of rotational movement and translation) based upon a timing signal sent from a recording controller 12, described later.

Figure 7:
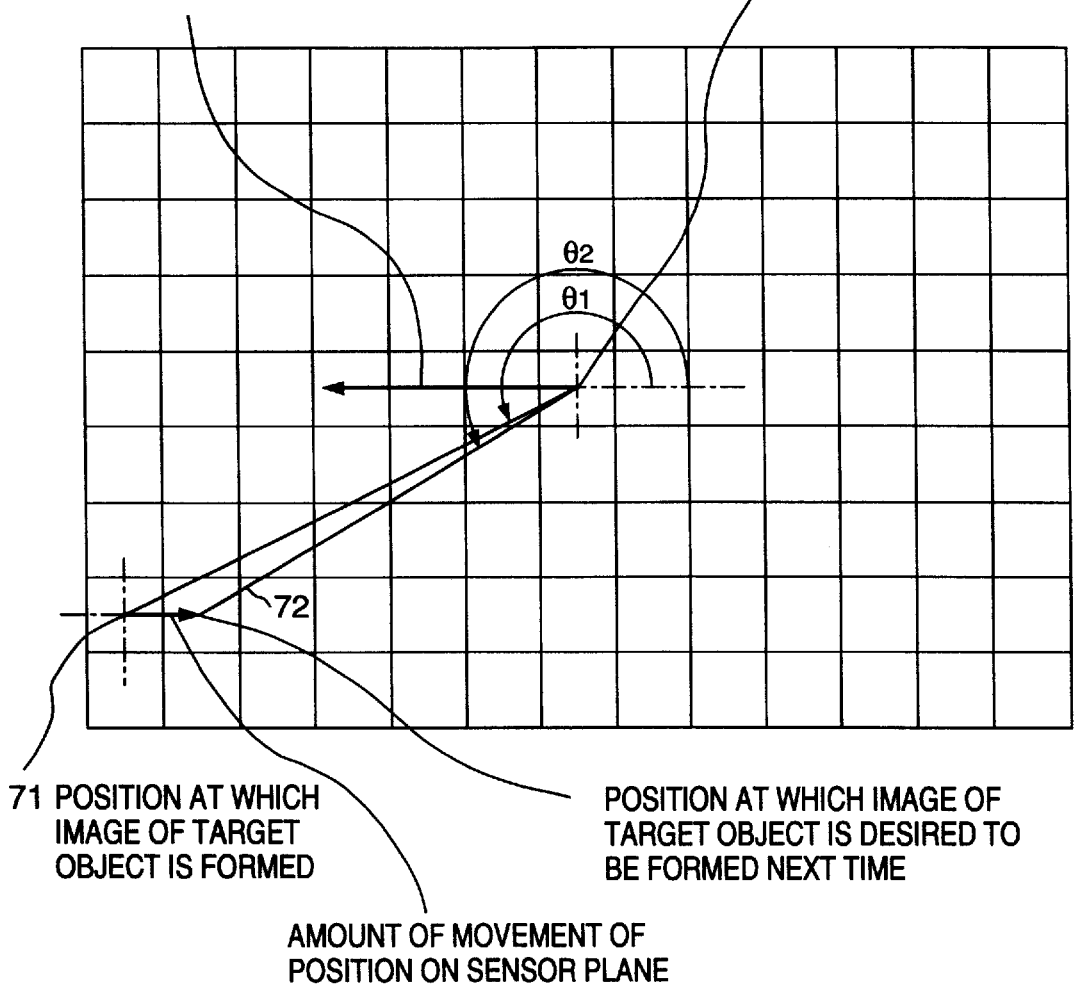
FIG. 7 is a diagram for describing operation of the second embodiment on the surface of an array sensor.

More specifically, as shown in FIGS. 2 and 7, the direction $(\phi_1,\theta_1)$ of an object of interest can be calculated from the center position of a sensor 71 which is currently forming the image of the object. Considering a line between the center position of the sensor 71 and the center position 70 corresponding to the optic axis sensor 72 selected on the basis of this line, which is desired to be the one that forms the image of the object of interest at the next instant in time. The direction $(\phi_2,\theta_2)$ of the object at the next instant in time is calculated from the center position of the sensor 72, and the amount of rotation of the optic axis to shift $(\phi_1,\theta_1)$ to $(\phi_2,\theta_2)$ is calculated.

As shown in FIG. 3, the detection frequency band of a sensor is shifted more and more toward the lower side of frequency the farther the sensor is from the center position 70 of the optic axis. Accordingly, by virtue of the control method described above, a power spectrum of the image data of the object of interest is successively obtained, in the form of time-series data from the low-frequency components, as the output of sensors forming the image of the object.

FIG. 7 illustrates the plane of the array sensor 10b. The center position 70 of the optic axis corresponds to a sensor which forms the image of the object situated on the optic axis of the optical system in a space being observed. If the object of interest is having its image formed at the position of sensor 71 on the plane of the array sensor 10b, then the sensed frequency component is that of the lowest frequency band since sensor 71 is most distant from the center position 70 of the optic axis. Accordingly, the sensor 71 forming the image of the object of interest and the center position 70 of the optic axis are connected by a line segment, and the optic axis is moved in such a manner that the image of the object of interest will be formed on the sensor 72, which is on this line segment and one closer to the center position 70 of the optic axis. Since the sensor 72 is closer to the center position 70 of the optic axis than the initial sensor 71, the frequency component sensed by the sensor 72 is in a frequency band slightly higher than that of the component sensed by the initial sensor 71. When the image of the object of interest has been formed at the center position 70 of the optic axis, the highest frequency is sensed by the corresponding sensor. Thus, by shifting the position at which the image of the object is formed incrementally closer to the center position 70 of the optic axis on the plane of the array sensor 10b, intensities from low to high frequency bands are obtained in a time series.

<Memory Controller 12>

The memory controller 12 controls write timing in such a manner that the timing at which the output image signal from the two-dimensional filter 11 is written in an external memory 14 and the timing at which the optic axis of the wide-angle lens 10 is moved will not coincide.

<External Memory 14>

The external memory 14 stores the output image signal from the two-dimensional filter 11 based upon a signal from the memory controller 12. It should be noted that the external memory 14 may store the output image signal of the two-dimensional filter 11, which signal conforms to the movement of the optic axis, as is, or may store the signal upon putting it in the format of a power spectrum or the like by a controller 15, described below.

<Controller 15>

(CPU 15a)

The CPU 15a controls the overall apparatus, particularly a key input unit 15c, a display unit 15b, the memory controller 12 and the external memory 14. The CPU 15a has a storage medium such as a ROM for storing a control procedure and a RAM for temporarily storing data. A program for putting the output image signal in the format of a multi-resolution expansion or power spectrum before or after storage in the external memory 14 also is provided. It should be noted that this program may be loaded in the RAM from an external storage medium such as a floppy disk or downloaded from a host computer or via a communication line.

(Display Unit 15b)

The display unit 15b is used to confirm an input from the key input unit 15c, confirm the status of the apparatus or display the results of processing a multi-resolution expansion or power spectrum.

(Key Input Unit 15c)

This unit is for entering a command or data from an external device. For example, the key input unit 15c is utilized to enter coordinate values of the location at which an object of interest is situated.

<Application to Multi-resolution Expansion>

Figure 4:
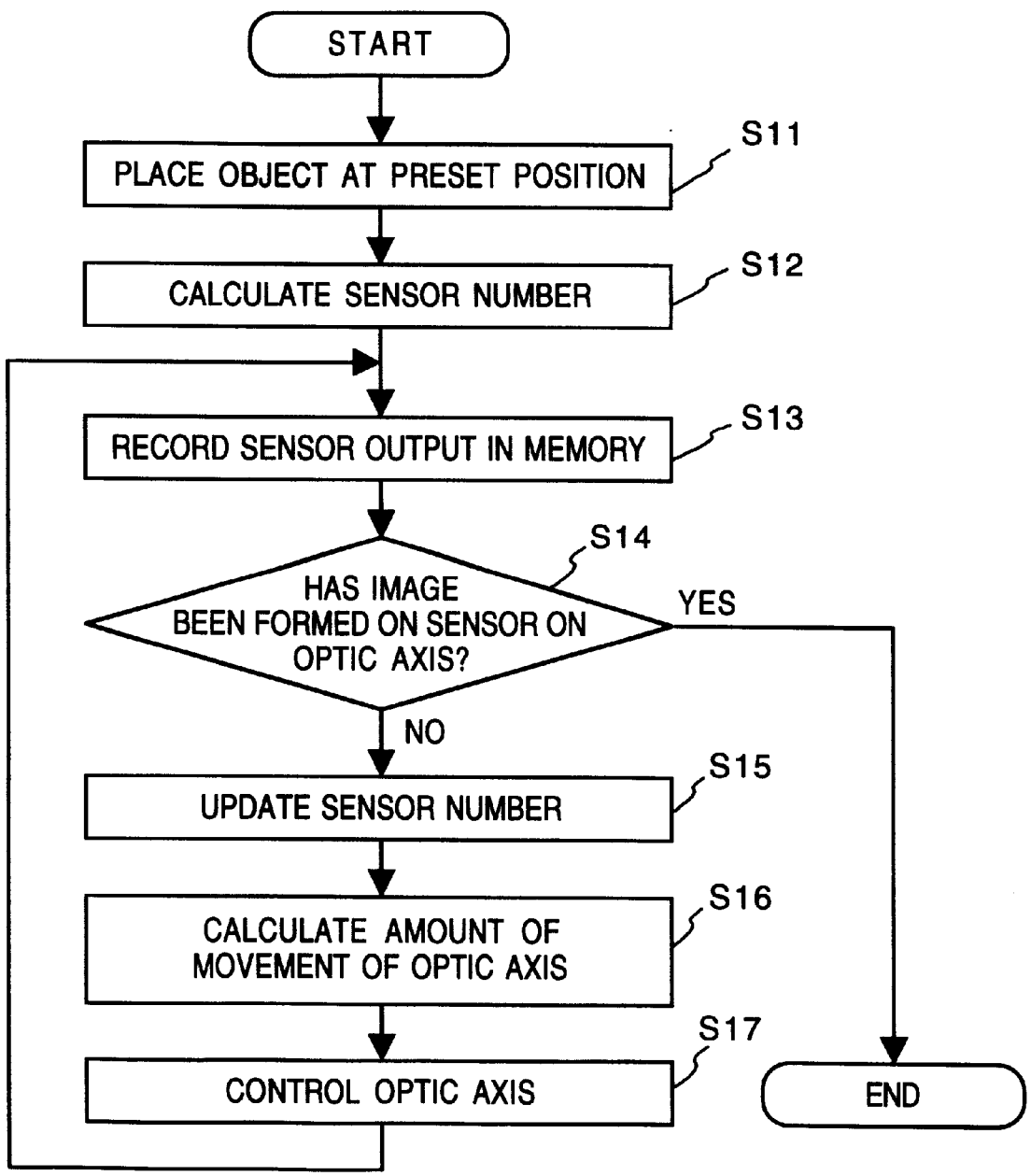
FIG. 4 is a flowchart showing an example of operation when the visual information processing apparatus of the first embodiment is applied to a multi-resolution expansion.

Operation will described for a case where the visual information processing apparatus is applied to the multiple-resolution expansion of the surface texture of an object situated at a certain position. FIG. 4 is a flowchart showing the procedure of the operation. The description will be limited to rotation of the optic axis in order to avoid a complex operation.

Step S11: The object is placed at a preset position and the position coordinates ($\phi_1, \theta_1$) of the object relative to the wide-angle lens system are entered from a key input unit 15c.

Step S12: The position at which the image of the object is formed and the index of the sensor corresponding to this position are calculated based upon the coordinate transformation equation [Equation (1)] cited above. It should be noted that the preset position desirably is adjusted in such a manner that the image is formed on the sensor situated at the boundary portion of the array sensor 10b.

Step S13: The output of the above-mentioned sensor is recorded in the external memory 14.

Step S14: When the position at which the image is formed arrives at the sensor located at the center position of the optic axis, processing is terminated.

Step S15: The center position, on the plane of the sensor array, of a sensor closer by one sensor to the center position of the optic axis than the above-mentioned sensor is calculated.

Step S16: On the basis of the coordinate transformation equation [Equation (1)], the direction ($\phi_2, \theta_2$) of a light ray whose image is formed on the center position of the sensor closer by one sensor to the center position of the optic axis is calculated, and the amount of rotational movement ($\phi_2 - \phi_1, \theta_2 - \theta_1$) is calculated.

Step S17: The optic axis is rotated based upon the amount of rotational movement, after which the program returns to step S13.

The above-mentioned flowchart has been described for a case where signal processing starts from a sensor situated at the boundary portion of the array sensor 10b. In a case where the image is not initially formed on a sensor situated at the boundary portion, the present procedure is executed once the optic axis has been rotated so as to form the image on a boundary sensor, or control is performed so as to obtain outputs up to a sensor at a boundary portion on the opposite side, or, since the frequency band sensed by a sensor in the boundary portion changes only little, the acquisition of data may be halted without obtaining all outputs up to the boundary portion. Further, though the foregoing flowchart has been described with regard to a case in which movement of the optic axis is limited to rotation of the optic axis, the present invention covers translation of the optic axis as well as zooming.

[Second Embodiment]

Figure 5:
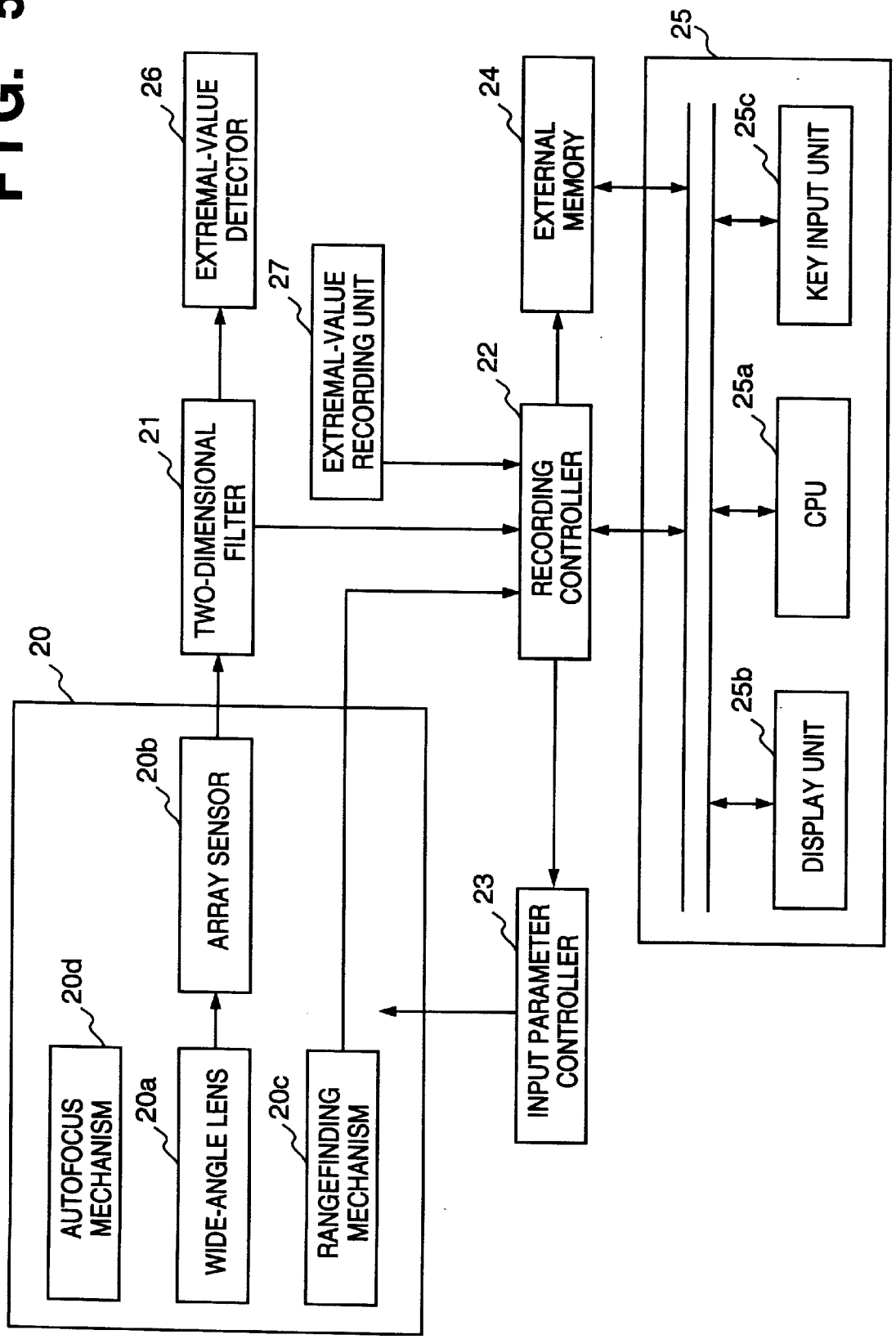
FIG. 5 is a block diagram illustrating an example of the construction of a visual information processing apparatus according to a second embodiment of the present invention.

FIG. 5 is a block diagram illustrating an example of the construction of a visual information processing apparatus according to a second embodiment of the present invention. According to the second embodiment, the encoding of an input image is performed by detecting a feature point and acquiring a feature quantity in the neighborhood of the feature point. The apparatus shown in FIG. 5 differs from that of FIG. 1 in the provision of an extremum detector 26 and a extremum memory 27. The other elements function in the same manner as those shown in FIG. 1.

<Extremum Detector 26>

The extremum detector 26 detects an extremum (maximum value, minimum value or absolute value of either of these) from the output of the two-dimensional filter 21 and outputs the pole value upon correlating it with the coordinates thereof. The detection of the extremum may be performed by detecting a reversal in the increase/decrease of the two-dimensional filter 21. It is particularly preferred that noise be removed by performing detection in combination with a predetermined threshold value.

<Extremum Memory 27>

The extrema outputted by the extremum detector 26 and the coordinates thereof on the array sensor are stored in the extremum memory 27.

<Application to Encoding>

Figure 6:
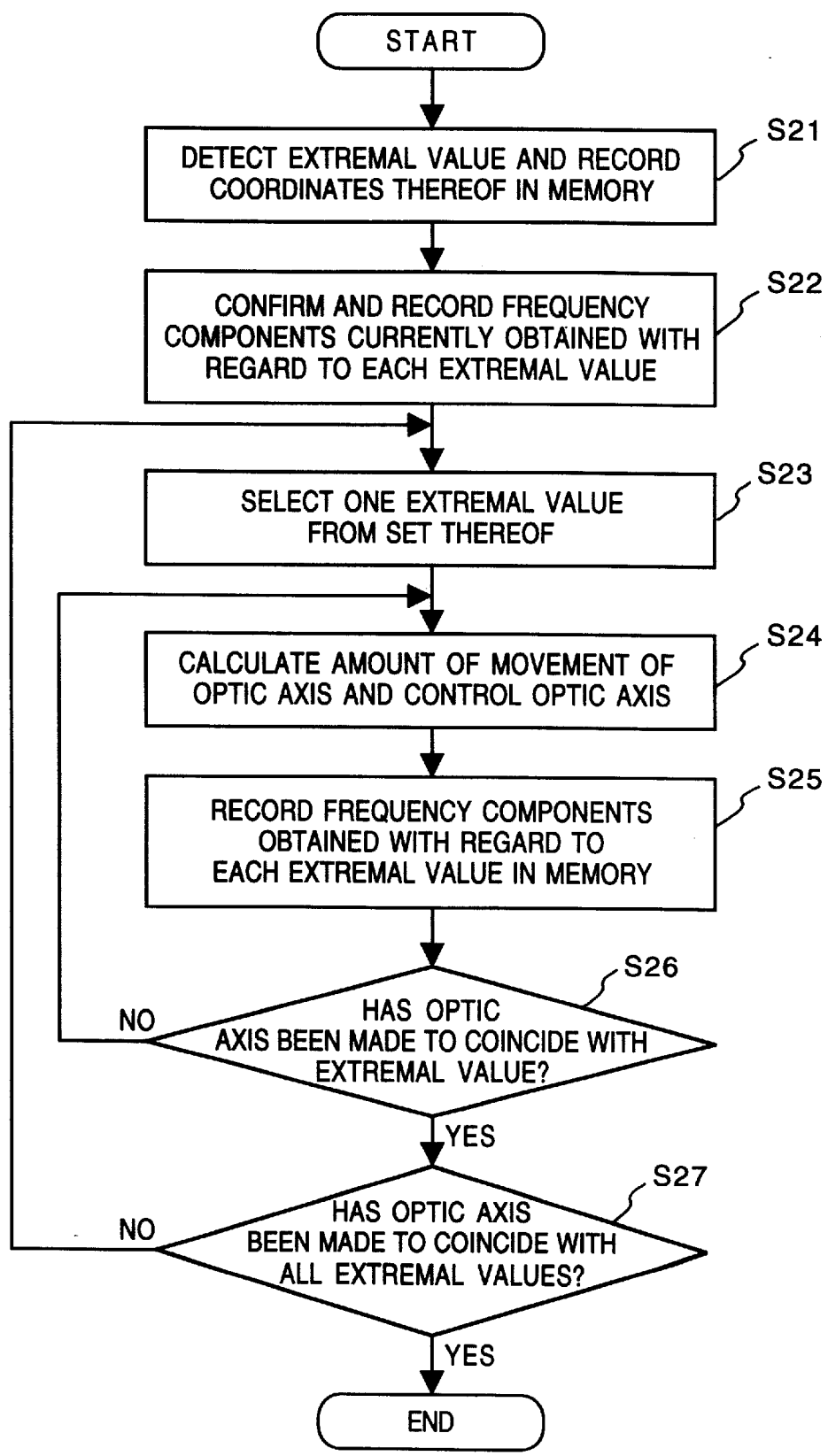
FIG. 6 is a flowchart showing an example of operation when the visual information processing apparatus of the second embodiment is applied to encoding.

The visual information processing apparatus constructed as shown in FIG. 5 will now be described in accordance with the flowchart of FIG. 6 for a case in which the apparatus is applied to the encoding of visual information.

Step S21: The extrema and the coordinate values thereof are acquired from the two-dimensional filter 21 and stored in the extremum memory 27.

Step S22: The frequency components obtained at the present point in time at the positions at which the extrema are present are confirmed, and the coordinates values and intensities are stored in the external memory 24.

Step S23: One extremum is selected on the basis of a suitable criterion for the coordinate values of the extremum that have been stored in the extremum memory 27. Depending upon the type of given visual information and processing method, a suitable criterion is chosen, such as a maximum value, minimum value or predetermined range.

Step S24: The center position of the optic axis on the array sensor 20b and the position of the above-mentioned extremum are connected by a line segment, an amount of control for movement of the optic axis is calculated so as to move the optic axis in the direction of a sensor situated on the line segment, and the optical axis is rotated (see FIG. 7).

Step S25: After movement, the position of each extremum and the frequency component obtained in the neighborhood thereof are stored in the external memory 24 in a form correlated with the coordinate values.

Step S26: It is determined whether the center position of the optic axis has come into agreement with the position of the above-mentioned extremum. If the answer is "YES", the next extremum is selected. If the answer is "NO", processing for moving the optic axis in such a manner that the extremum will approach the center position of the optic axis is repeated.

Step 27: If the series of processing steps for bringing the center position of the optic axis into coincidence with all extremum is finished, encoding is terminated.

In this embodiment, movement of the optic axis includes translation and zooming. Furthermore, if this embodiment is implemented at a predetermined period or at the timing of the appearance of feature points or movement thereof, it is possible to detect the feature points moved and to acquire the feature quantities in the vicinity thereof.

The foregoing embodiments provide a visual information processing method and apparatus for obtaining suitable visual information at high speed. The embodiments further provide a visual information processing method and apparatus which, through a simple arrangement, make it possible to obtain a multi-resolution approximation or multi-resolution space effective as an expedient for expressing an image. More specifically, the advantages of the embodiments are as follows:

1. By controlling the optic axis of a wide-angle lens so as to make the optic axis coincide with a preset coordinate position, a multi-resolution approximation (multi-resolution pyramid) of the surface texture of an object of interest can be obtained as time-series data. Further, a power spectrum with regard to the spatial frequency of the surface texture of an object of interest can be obtained as time-series data.

2. By detecting and storing an extremum, encoding based upon the position of an extremum in an input image can be achieved. More specifically, by performing control in such a manner that the direction of the optic axis is made to coincide with the direction in which one of extrema of output from a two-dimensional filter is present, the invention can be utilized in detecting a feature point such as an edge and in acquiring a feature quantity in the neighborhood thereof.

3. A stored power spectrum and a symbol can be made to correspond. Furthermore, by obtaining the position of a symbol, which is capable of existing at the same time as the first-mentioned symbol, relative to the first-mentioned symbol and controlling the amount of rotational movement of the optic axis, the optic axis can be pointed in a suitable direction. More integrated knowledge of the environment is obtained very efficiently.

4. By providing the optical system with a zoom function, the spatial characteristic of spatial frequency detected by the wide-angle lens can be changed. The maximum frequency detected can be changed.

[Third Embodiment]

A third embodiment of the present invention will now be described.

This embodiment has been devised to improve the efficiency with which an image is accepted in the image sensing system of a scanner or the like employing a fisheye lens in the image sensing system. The efficiency is improved by suitably controlling a two-dimensional image input unit, a device for extracting a feature quantity of a two-dimensional image, an encoder, etc.

First, as background to this embodiment, a conventional image input unit may use an input system which is an ordinary lens system such as in a video camera, a lens system for realizing identity mapping or a line sensor such as in a scanner, or an input system in which the coordinate transformation from a coordinate system in real space to coordinates on a sensor plane is linear.

If the spacing between the sensors of an array sensor is constant in such an input system, and if the sampling frequency is high enough, an advantage is that the input data will contain enough information for processing to be executed successively.

However, the above-mentioned input system samples any subregion of a given image at fixed and uniform sampling period, even if a subregion includes no utilizable information. Consequently, the amount of information obtained with regard to such data is small for the time expended.

The present invention has been devised to solve this problem. Specifically, an area in which there is no change in an image signal is subjected to coarse sampling and an area where there is a great change in the image signal is subjected to fine sampling. As a result, image input which is efficient in terms of time is realized.

Further, by using a fisheye lens as image input means and providing optic-axis position control means, even more efficient image input can be achieved.

This embodiment will be described in detail with reference to FIG. 8.

Figure 8:
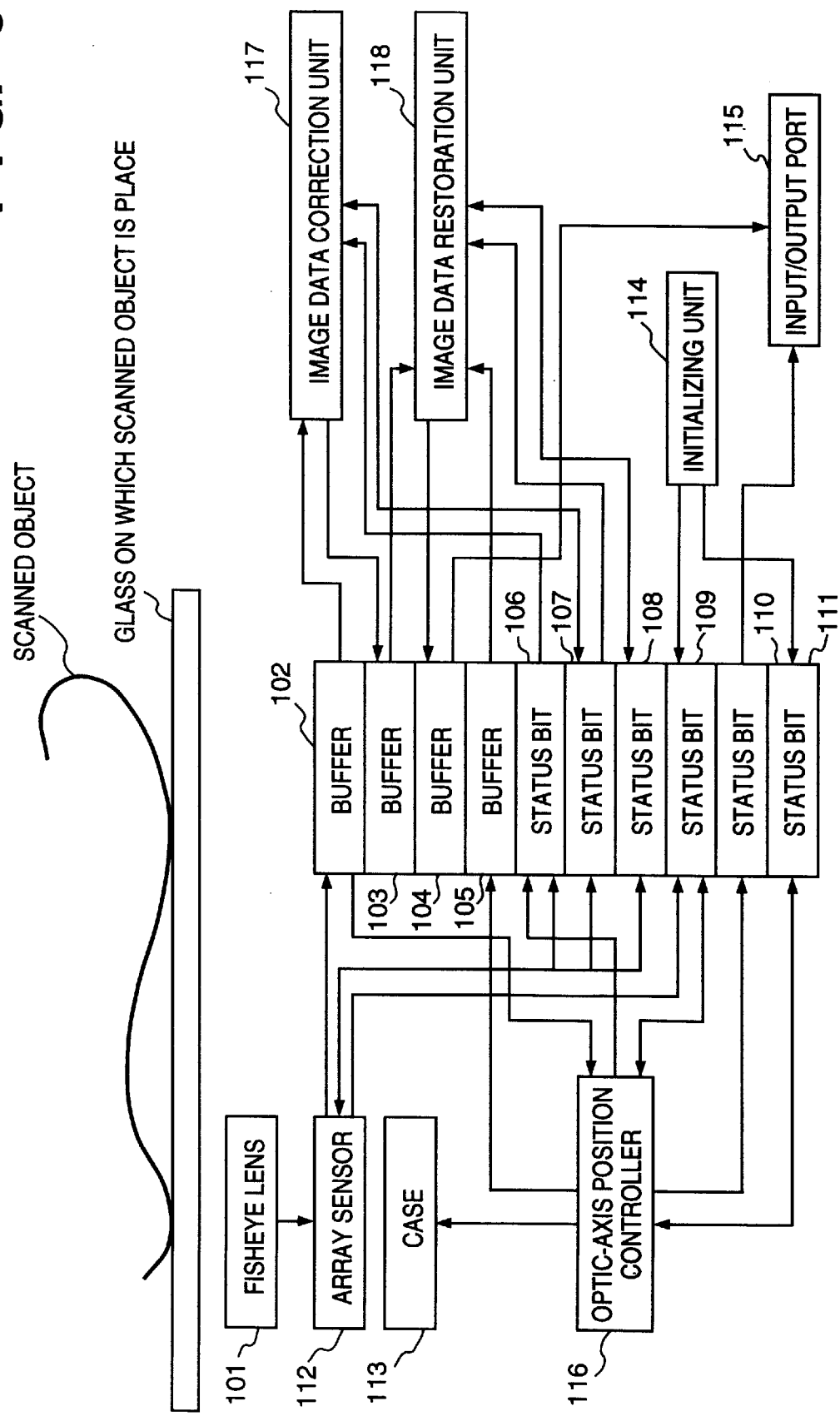
FIG. 8 is a block diagram illustrating an example of the construction of a visual information processing apparatus according to a third embodiment of the present invention.

In accordance with the embodiment of FIG. 8, numeral 101 denotes a fisheye lens serving as the image-input optical system. Though a stereographic projection lens is described as the fisheye lens, another fisheye lens, such as an orthogonal projection lens or equisolidangle lens can be used.

In the optical system of the fisheye lens 101, let $\gamma$ represent the radius of polar coordinates on an image plane located at a position which is a distance L from the lens center, let $\rho$ represent the radius of polar coordinates after the image is transformed by the fisheye lens, let $\theta$ represent the azimuth angle, $\phi$ the angle of incidence of light with respect to the optic axis and $\xi$ the focal length of the lens. The radii $\gamma$ and $\rho$ are respectively represented by the following equations:

$$\rho = 2\xi \tan(\phi/2) \tag{7}$$

$$\gamma = L \tan(\phi) \tag{8}$$

From these it is possible to express $\gamma$ as a function of $\rho$ in the equation below. If this function is expressed in the form of an inverse function FISHEYE$-1(\rho)$ of a fisheye lens optical system, we have $$\gamma = \text{FISHEYE}-1(\rho) = L(\rho/\xi)/\{1-(\rho/2\xi)^2\} \tag{9}$$

This means a coordinate transformation from a $(\delta,\theta)$ coordinate system to a $(\gamma,\theta)$ coordinate system in a stereographic projection lens.

Numeral 112 denotes an array sensor for image sensing. In this embodiment, use is made of a two-dimensional image sensor in which sensors are arrayed in a two-dimensional lattice.

A buffer 102 stores output data from the array sensor 112, a buffer 103 stores image data from an image data correction unit 117, a buffer 104 stores image data from an image data restoration unit 118, and a buffer 105 stores optic-axis position data which correspond to the image data stored in the buffer 102.

Numerals 106, 107, 108, 109, 110, 111 denote status bits for performing various operations and controlling state in the image input unit according to this embodiment. The bits store the values of "0" and "1".

The array sensor 112 converts the optical image formed by the fisheye lens 101 to a digital image in which spatial coordinates are represented as discrete values, and outputs the digital image. The array sensors 112 executes a procedure for storing the data in the buffer 102 only when the status bit 106 is "1" and, moreover, the status bits 107, 108 are "0".

Let m, $\Delta X$ represent the sensor index and sensor spacing in the horizontal direction, respectively, let n, $\Delta Y$ represent the sensor index and sensor spacing in the vertical direction, respectively, and let $g_{m,n}$ represent the output of a sensor at index (m,n).

The relationship with the polar coordinates on the plane of the array sensor can be expressed by the following equations, where $(M_c, N_c)$ represents a sensor index corresponding to the origin of the polar coordinate system (the origin corresponding to the point at which the optic axis of the fisheye lens intersects the plane of the image scanned):

$$\Delta x(m-M_c) = \rho \cos \theta$$

$$\Delta y(n-N_c) = \rho \sin \theta \tag{10}$$

The procedure for storing data in the buffer 102 is completed by setting the status bit 106 to "0" and the status bits 107, 108 to "1".

Numeral 113 denotes the case of the image input unit, in which the fisheye lens 101 and array sensor are secured. An initializing unit 114 initializes the image input unit, and an input/output port 115 receives input parameters from the outside and sends image data to the outside.

An optic-axis position controller 116 (which corresponds to the input-parameter controller of FIG. 1) starts a procedure for controlling the optic axis when the status bit 109 is "1" and is independent of the values of the status bits 106, 107 and 108.

On the basis of the image data that have been stored in the buffer 102, the amount of movement of the optic axis of the fisheye lens 101 is calculated and the case 113 is moved two-dimensionally. A method of calculating the amount of movement of the optic axis will now be described.

(a) Let $l_{m,n}$ represent the intensity (a three-dimensional vector in case of color) of a pixel whose index is (m,n) in the two-dimensional image that has been stored in the buffer 102.

(b) A feature point is detected by applying suitable image processing to the image data $\{l_{m,n}\}_{m,n}$, and the sensor that is closest to the present position of the optic axis is selected. For example, in a case where a color other than background has been detected by sensors at $(m_1,n_1)$ and $(m_2,n_2)$, $(n_1-N_c)^2$ and $(n_2-N_c)^2$ are compared and the smaller is selected as the next center position of the optic axis. When these values are equal to each other, whichever of $(m_1-M_c)^2$ and $(m_2-M_c)^2$ corresponds to a small value is selected as the next center position of the optic axis.

(c) Assume that the sensor whose index is $(m_1,n_1)$ is selected. On the basis of this index, the position (in rectangular coordinates) $(x_1,y_1)$ of the index $(m_1,n_1)$, relative to the present position of the optic axis, on the actual image plane is calculated.

$$x_1 = \gamma_1 \cos(\theta_1)$$
$$y_1 = \gamma_1 \sin(\theta_1) \tag{11}$$

where $$\gamma_1 = FISHEYE^{-1}\left\{\sqrt{\Delta_x^2(m_1 - M_c)^2 + \Delta_y^2(n_1 - N_c)^2}\right\} \tag{12}$$

$$\theta_1 = \tan^{-1}\left\{\frac{\Delta x(n_1 - N_c)}{\Delta y(m_1 - M_c)}\right\}, \quad \text{if } (m_1 - M_c) > 0$$

$$= \tan^{-1}\frac{(n_1 - N_c)}{(m_1 - M_c)} + \pi, \quad \text{else if } (m_1 - M_c) < 0$$

$$= \pi/2, \quad \text{else if } (m_1 - M_c) = 0 \text{ and } (n_1 - N_c) < 0$$

$$= -\pi/2, \quad \text{otherwise} \tag{13}$$

The coordinates calculated give the two-dimensional amount of movement of the optic axis. The optic-axis position controller 116 moves the case 113 in such a manner that the optic axis will coincide with the coordinates $(x_1,y_1)$. The procedure for controlling the optic axis is completed by setting the status bit 109 to "0" and the status bit 106 to "1".

The image data correction unit 117 starts a procedure for correcting the image data when the status bit 106 is "0" and the status bit 107 is "1". This procedure corrects image data located in a predetermined range measured from the optic axis. An example of the procedure will be described for a case where the index of the sensor corresponding to the optic axis is (Mc,Nc) and a range to be corrected is specified by the radius from the optic axis R.

(a) A partial image is created by extracting only pixels whose index (m,n) satisfy the relation $(m-Mc)^2+(n-Nc)^2 <R^2$ from the image data that have been stored in the buffer 102.

(b) An inverse mapping of the mapping function of the fisheye lens is applied and the position (m,n) of each pixel of the partial image is corrected to (m',n'). The correction is given by the following equations:

$$m'=FISHEYE^{-1}(\rho)\cos(\theta)$$
$$n'=FISHEYE^{-1}(\rho)\sin(\theta) \tag{14}$$

where $$\rho = \sqrt{\Delta_x^2(m_1 - M_c)^2 + \Delta_y^2(n_1 - N_c)^2} \tag{15}$$

$$\theta = \tan^{-1}\left\{\frac{\Delta x(n_1 - N_c)}{\Delta y(m_1 - M_c)}\right\}$$

(c) The corrected image data are written in the buffer 103. The correcting procedure is completed by setting the status bit to "0".

The image data restoration unit 118 executes a procedure only when the status bit 107 is "0" and the status bit 108 is "1". The procedure executed by the image data restoration unit 118 reproduces a single two-dimensional image based upon the image data that have been stored in the buffer 103 and the coordinates of the optic axis that have been stored in the buffer 105.

(a) Let I(m,n) represent image data that have been stored in the buffer 103, J(k,l) image data that are to be stored in the buffer 104 and (x1,y1) coordinates of the optic axis that have been stored in the buffer 105. It should be noted that the coordinates of the optic axis are expressed with the home position serving as the origin. If the resolution and the size of the image input unit in this embodiment is $p_x$ and $L_x$ in the horizontal direction and $p_y$ and $L_y$ in the vertical direction respectively, the output image finally obtained will be a digital image in which the number of pixels is $L_x/p_x$ horizontally and $L_y/p_y$ vertically.

(b) The pixel index $(m_o,n_o)$ corresponding to the coordinates of the optic axis is given by the following equations:

$$m_o = x_1/p_x$$
$$n_o = y_1/p_y \tag{16}$$

(c) A subimage of J(k,l) with the same size of I(m,n) centered on the pixel index $(m_o,n_o)$ is replaced by I(m,n). The status bit 108 is set to "0".

The image input unit constructed as set forth above enters a given target image in the following manner:

1. When start of image input is designated by a certain method (e.g., in response to a signal from a start key or input/output port), the initializing unit 114 sets the status bits 109, 111 to "1" and sets all other status bits to "0".

2. The optic-axis position controller 116 is allowed to execute a procedure for moving the optic axis when the status bits other than 109 and 111 are "0". Since the status bits 109 and 111 are both "1", the optic-axis position controller 116 moves the optic axis to the home position. If movement has been completed, the optic-axis position controller sets the status bits 109 and 111 to "0" and the status bit 106 to "1".

3. When the status bit 106 is "1" and all other status bits are "0", the array sensor 112 is allowed to execute a procedure for inputting an image. More specifically, the array sensor 112 checks the values of the status bits 106~109 at all times and starts the procedure only when the status bit 106 is "1" and the other bits 107~109 are all "0". The array sensor 112 stores the signal, which has been sensed by a sensor, in the buffer 102 as a two-dimensional image. If the procedure for storing data in the buffer 102 is finished, the status bit 106 is set to "0" and the status bits 107 109 are set to "1".

4. The image data correction unit 117 checks the values of the status bits 106 and 107 and starts processing only when the status bit 106 is "0" and the status bit 107 is "1". The image data correction unit 107 corrects the image data, which have been stored in the buffer 102, by the above-described correction processing and writes the processed data in the buffer 103. When the processing for writing the data in the buffer 103 is completed, the status bit 107 is set to "0".

5. The image data restoration unit 118 checks the values of the status bits 107 and 108 at all times and starts processing only when the status bit 107 is "0" and the status bit 108 is "1". On the basis of the image data that have been stored in the buffer 103 and the optic-axis position coordinates that have been stored in the buffer 105, the image data restoration unit 118 executes restoration in accordance with the processing method described above and sequentially updates the image data that have been stored in the buffer 104. When the procedure for updating the data is finished, the status bit 108 is set to "0".

6. The optic-axis position controller 116 checks the values of the status bit 109 at all times and starts processing only when the status bit 109 is "1". Here the values of the status bits 106~108 are irrelevant. When the status bit 109 is "1", first the status bit 111 is checked. The initialization processing mentioned above is executed if this bit is "1" and the above-mentioned procedure for moving the optic axis is executed if this bit is "0". If this procedure is finished, the status bit 106 is made "1".

The execution of any procedure described above is determined by the value of the status bits. This means that the optic-axis position controller 116 is allowed to execute the procedure except when the array sensor 112 is operating. In other words, the optic-axis position controller 116 is allowed to execute the procedure at the same time as either the image data correction unit 117 or image data restoration unit 118.

More specifically, in accordance with the present invention, in an image input unit having the initializing unit 114, the fisheye lens 101, the array sensor 112, the case 113, the buffers 102~105, the image data correction unit 117, the image data restoration unit 118, an image data recording unit (not shown), the status bits 106~111, the input/output port 115 and the optic-axis position controller 116, the initializing unit 114 sets the status bits 106~108, 110 to "0" and sets the status bits 109, 111 to "1". The array sensor 112 outputs a detection signal to the buffer 102 only when the status bit 106 is "1", the status bit 107 is "0" and the status bit 108 is "0", and sets the status bit 106 to "0", rewrites the status bits 107~109 to "1" and writes the present coordinates of the optic axis in the buffer 105 if one frame of the image has been outputted. The image data correction unit 117 corrects the image data recorded in the buffer 102 by a prescribed correction method only when the status bit 106 is "0" and the status bit 107 is "1", outputs the corrected image data to the buffer 103 and rewrites the status bit 107 to "0" when recording is finished. The image data restoration unit 118 combines an image, which is obtained by converting the image data recorded in the buffer 103 on the basis of the coordinates of the optic axis recorded in the buffer 105, with the image data recorded in the buffer 104 only when the status bit 107 is "0" and the status bit 108 is "1", and rewrites the status bit 108 to "0" when the procedure is completed. The optic-axis position controller 116 moves the case 113 to the predetermined home position when the status bits 109 and 111 are "1" and rewrites the status bit 109 to "0" and the status bit 106 to "1" when the movement is completed. Further, the optic-axis position controller 116 reads in the data recorded in the buffer 102 only when the status bit 109 is "1" and the status bit 111 is "0", selects one pixel in the image data by a predetermined processing method, calculates the coordinates corresponding to this pixel on the input object of interest from the index of the selected pixel, rewrites the status bit 110 to "1" when the calculated coordinate values are greater than predetermined values, moves the case 113 in two dimensions based upon the calculated coordinates when the values thereof are not greater than the predetermined values, and rewrites the status bit 109 to "0" and the status bit 106 to "1" when movement is completed. The input/output unit 115 outputs the image data recorded in the buffer 104 only when the status bit 110 is "1".

In other words, an image sensed by the fisheye lens 101 is converted to an electric signal by the array sensor 112. However, by controlling the status bits, the image is not sampled uniformly in the same way throughout. Rather, feature points of the image are sensed and a change in feature points is detected. As a result, the portion of an image which changes is identified and the image can be sampled while moving the image sensing system. This makes it possible to discriminate an unchanging background portion of an image from the principal part of the image desired to be sensed and to performing image sensing very efficiently.

[Fourth Embodiment]

Figure 9:
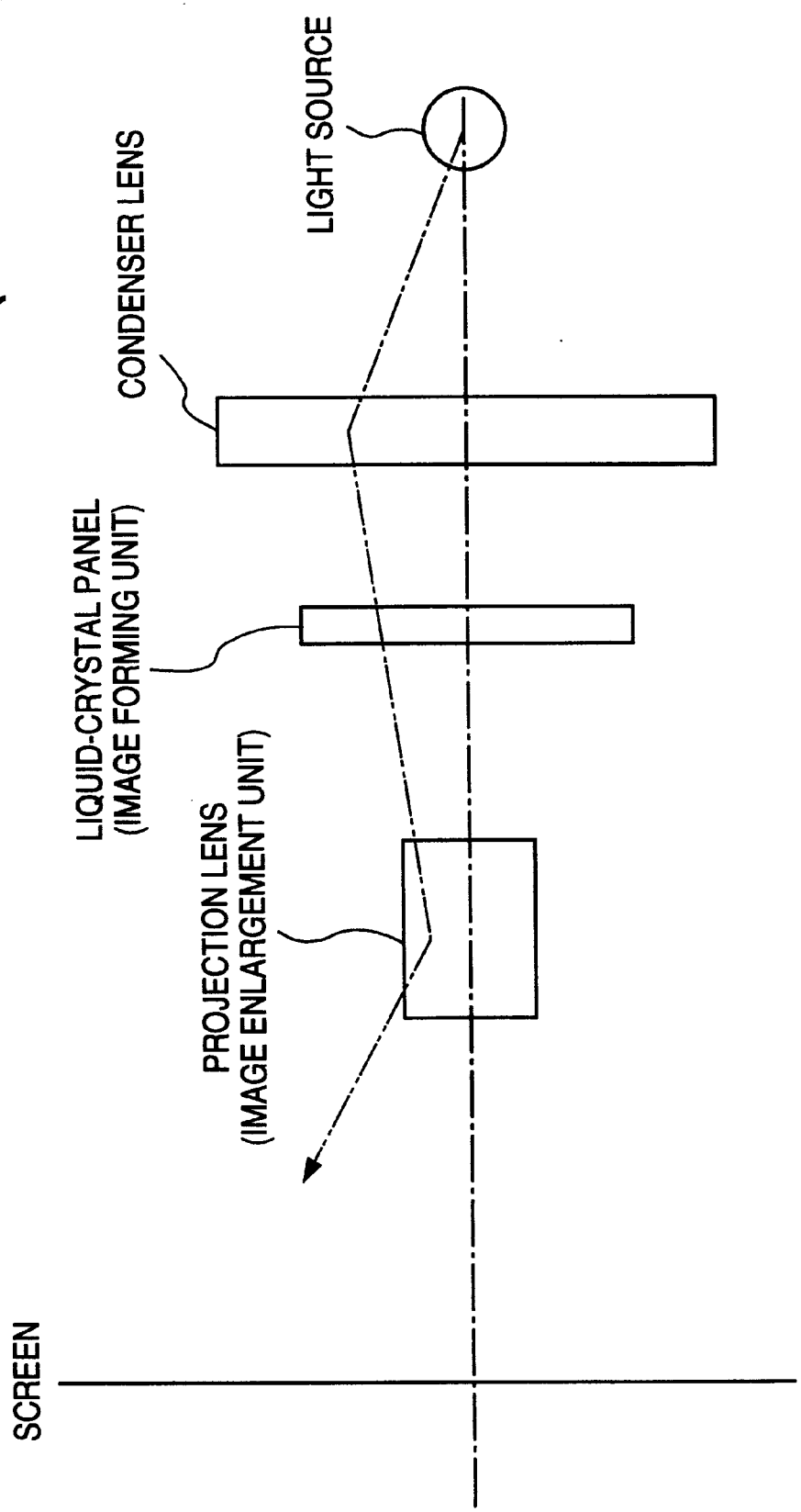
FIG. 9 is a diagram showing a first example of the prior art corresponding to fourth through seventh embodiments of the invention.
Figure 10:
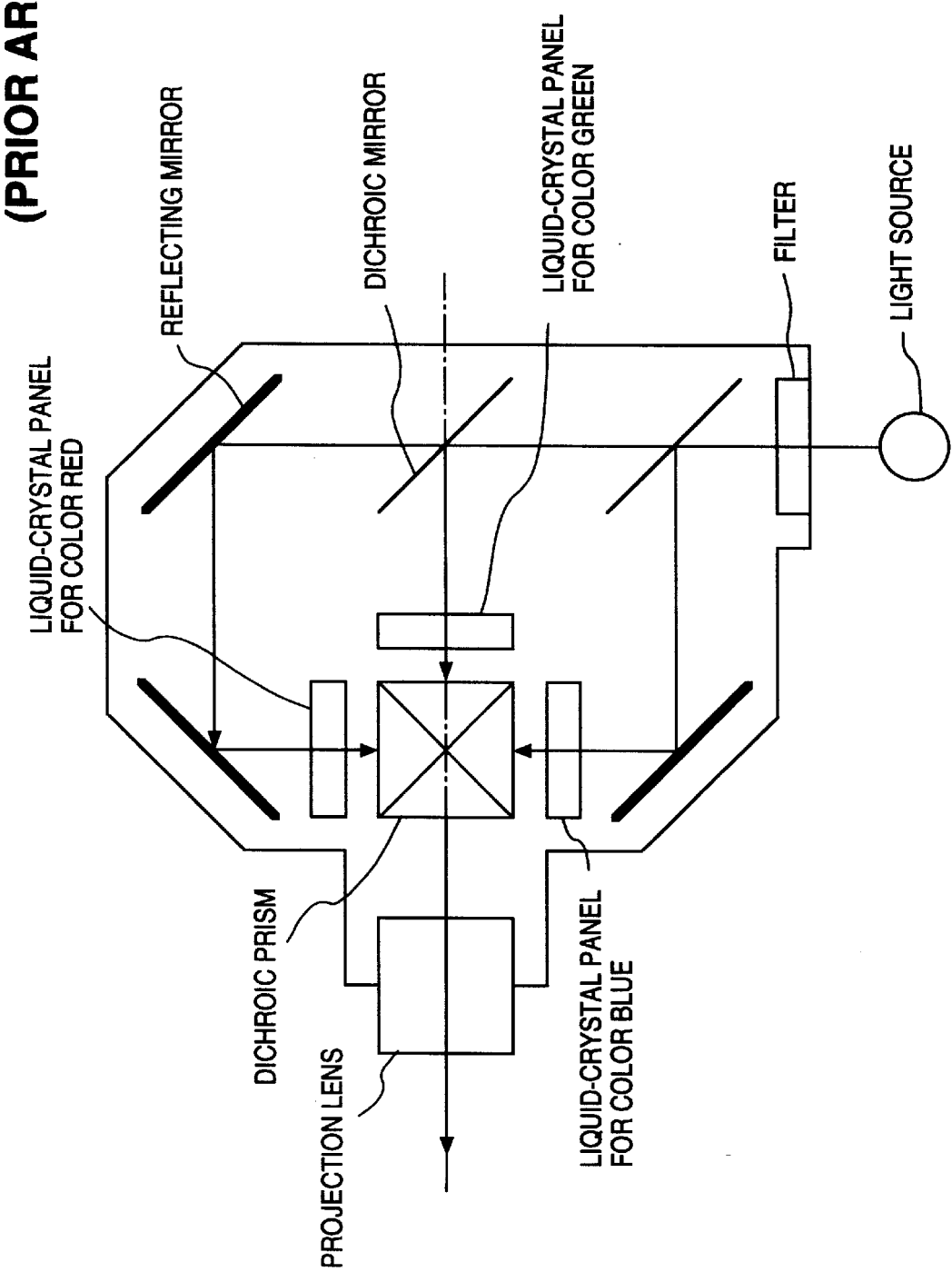
FIG. 10 is a diagram showing a second example of the prior art corresponding to fourth through seventh embodiments of the invention.

A prior-art example of an image display unit is illustrated in FIG. 9 (black-and-white) and FIG. 10 (color). In case of the color display, the monochromatic system is provided for each of the colors R, G and B.

In accordance with FIG. 9, an image is displayed by a liquid-crystal display panel, light emitted by a light source is condensed by a condenser lens, and the displayed image is illuminated by the condensed light. The image is enlarged and projected upon a screen by a projection lens. This is referred to as so-called "liquid-crystal projection".

FIG. 10 illustrates a system which, in principle, is similar to the monochromatic system of FIG. 9. This system has an image-forming liquid-crystal panel for each of the color components R, G, B. In addition, light from a light source is acted upon by a filter, at least three reflective mirrors and at least two dichroic mirrors, the resulting light rays are combined and the light is then projected upon a screen via a projection lens.

In general, the larger the angle of view of an observer viewing a display, the greater the realism or presence of the picture. Though this is desirable even in an image display unit such as an ordinary TV monitor, it is an even more important function for the finder of an integrated camera/video device. The reason for this is that when the user is looking at the finder, information other than that in a limited region cannot be seen and the user cannot perceive obstacles that are nearby.

With regard to video representation, there are instances where, in a children's outing, for example, the photographer wishes to photograph his or her own child at a high resolution and photograph the periphery at a low resolution over a wide angle.

In the example of the prior art described above, the effective picture is limited to an area in which the coordinate system is not distorted. It is also so arranged that resolution will be uniform over the entire image. The following two methods are available as methods of widening the angle of view in order to obtain presence with such an arrangement: The first entails increasing the number of pixels of the image in order to maintain the resolution of the image, and the second entails sacrificing resolution in an effort to maintain the pixel size of the image.

Accordingly, in the embodiment described below, a fisheye lens is used as an optical lens system for sensing a scene of interest, thereby making it possible to achieve a wide angle of view of over 180°} with a high resolution near the optic axis and a lower resolution at the periphery. As a result, a limited area desired to be recorded accurately and a wide area peripheral to the limited area can be recorded at the same time. Further, a processing system for implementing an inverse mapping of the fisheye lens is provided as a display unit, thereby making it possible to view an image, which has been distorted by the fisheye lens, as an undistorted image having a viewing angle of more than 180°}.

Figure 11:
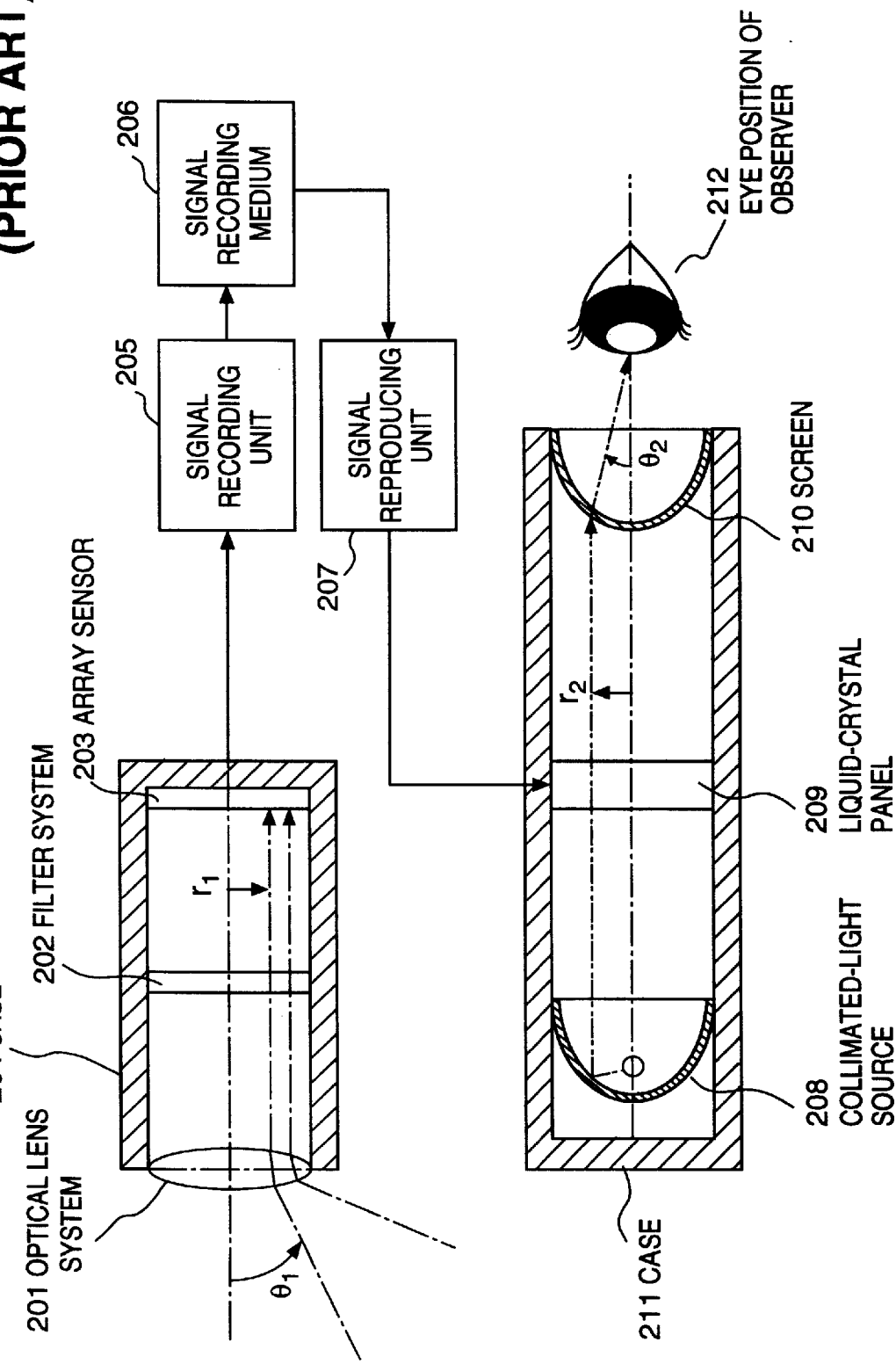
FIG. 11 is a diagram showing an example of the construction of an image display unit according to the fourth embodiment.

FIG. 11 is a diagram best showing an image display unit according to this embodiment. An optical lens system 201 includes a fisheye lens. The radius $r_1$ of a polar coordinate system after transformation by the fisheye lens is written as follows using the angle of incidence $\theta_1$ with respect to the optic axis:

(a) in case of an orthogonal projection lens: $r_1 = \xi \sin(\theta_1)$;
(b) in case of an equidistant lens: $r_1 = \xi \theta_1$;
(c) in case of a equisolidangle projection lens: $r_1 = 2\xi \sin(\theta_1/2)$;
(d) in case of a stereographic projection lens: $r_1 = 2\xi \tan(\theta_1/2)$.

Here $\xi$ represents the focal length of the lens. Further, since the optical system is rotationally symmetrical, the drawings and description below deal with the radial direction only.

A filter system 202 is inserted into the optical system. In order to obtain a color image, the incident light is decomposed into the R, G, B components by the filter system. A two-dimensional array sensor 203, which may be an image sensing device such as a CCD, samples the image from the fisheye lens two-dimensionally. Use is made of an ordinary array sensor having a uniform sensor spacing. A case 204 housing the image sensing system is used to fix the optical lens system 201, the filter system 202 and the two-dimensional array sensor 203. A signal recording unit 205 records the output signal of the two-dimensional array sensor 203 on a signal recording medium 206. The latter may be a semiconductor memory, a magnetic recording medium or an optical recording medium. A signal reproducing unit 207 read out the signal that has been recorded on the signal recording medium. A back-lighting light source 208 produces collimated light for illuminating a display that displays the image reproduced by the image reproducing unit 207. A liquid-crystal panel 209 displays the image reproduced by the image reproducing unit 207. More specifically, the liquid-crystal panel 209 is capable of controlling the transmittance of each pixel based upon the two-dimensional signal read out by the image reproducing unit 207. An image is produced as a result. A back-projection-type screen 210 is observed by the viewer. A case 211 secures the collimated-light source 208, the liquid-crystal panel 209 and the screen 210 in the positional relationship illustrated, thereby constructing the image display unit.

The operation of this arrangement will now be described. Since the operation of the image sensing part has been described in the foregoing embodiments, the description will be rendered with regard to the display part.

1. Though distorted by the fisheye lens 201, the image sensed over a wide angle is sampled by the two-dimensional array sensor 203 and the image (sequence of images) obtained is recorded on the signal recording medium 206 via the signal recording unit 205.

2. The recorded image (sequence of images) is read out of the signal recording medium 206 and supplied to the liquid-crystal panel 209 by the image reproducing unit 207.

Figure 12:
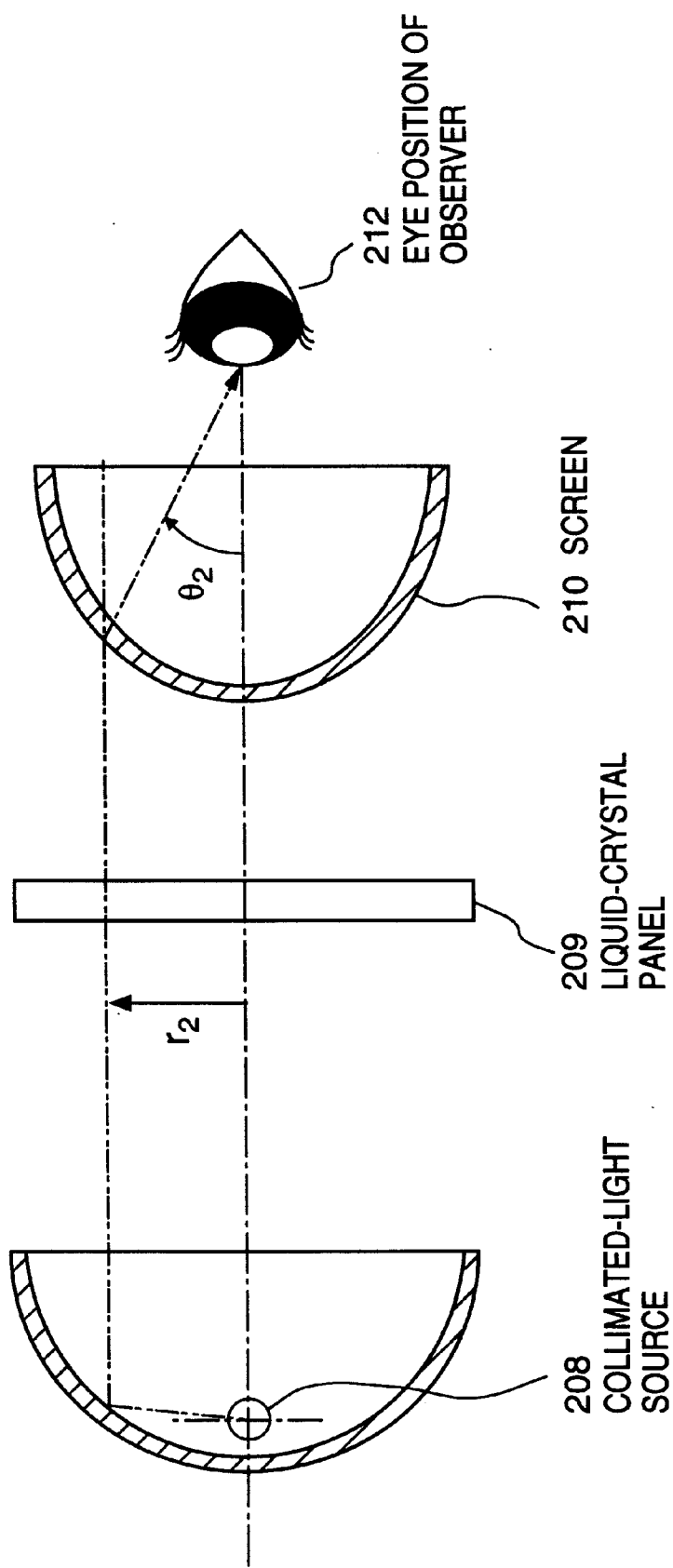
FIG. 12 is a diagram for describing the display of FIG. 11.

3. The screen 210 is so configured that a pixel of the liquid-crystal panel 209 at a distance $r_2$ from the optic axis will reside at a position at which the angle of incidence is $\theta_2$ as seen from an observer 212. In this case, $r_2$ and $\theta_2$ satisfy the relation of the fisheye lens 201 described above (see FIG. 12).

Thus, video over a viewing angle of 180°} can be obtained from an image represented by a limited two-dimensional planar area, namely the liquid-crystal panel 209.

In other words, even though it is distorted by the fisheye lens 201, the image accepted over a wide angle is projected on the screen 210 corresponding to the mapping function of the fisheye lens 201, thereby compensating for the distortion. As a result, a distortion-free wide-angle image can be obtained over a viewing angle of 180°}.

[Fifth Embodiment]

Figure 13:
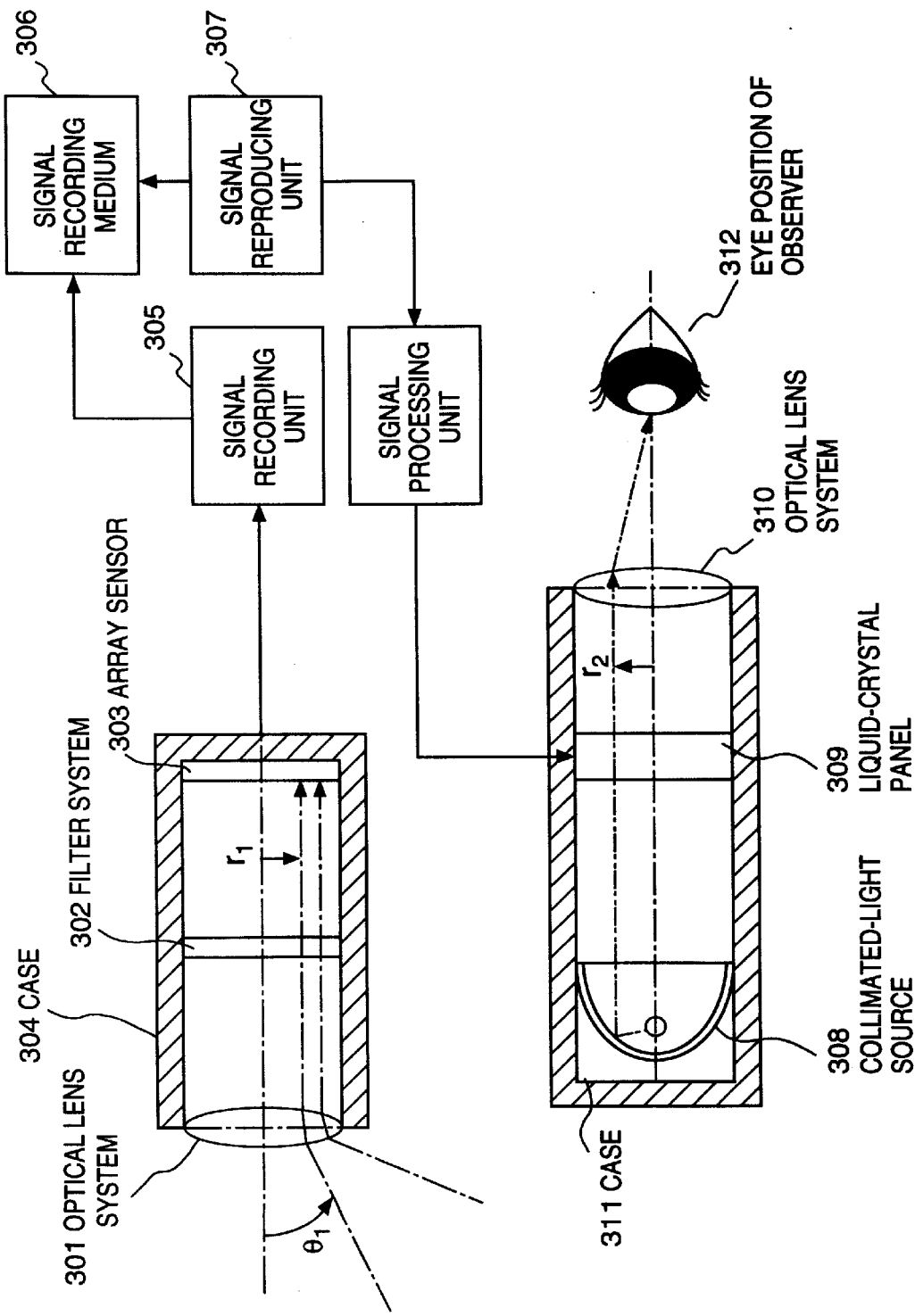
FIG. 13 is a diagram showing an example of the construction of an image display unit according to the fifth embodiment.

FIG. 13 is a diagram illustrating another embodiment, which provides an optical lens system with the screen-image conversion function of the display system according to the fourth embodiment.

An optical lens system 301 includes a fisheye lens the same as that of the fourth embodiment. Numeral 302 denotes a filter system, 303 a two-dimensional array sensor, 304 a case, 305 a signal recording unit, 306 a signal recording medium, 307 a signal reproducing unit, 308 a collimated-light source and 309 a liquid-crystal panel, which are identical with those of the fourth embodiment. Further, numeral 310 denotes an optical lens system of the image display section, and 311 represents a case for fixing the collimated light source 308, liquid-crystal panel 309 and optical lens system 310 in the positional relationship illustrated.

The operation of this arrangement will now be described. Since the operation of the image sensing part has been described, as in the case of the fourth embodiment, the description will be rendered with regard to the display part.

1. Though distorted by the fisheye lens 301, the image sensed over a wide angle is sampled by the two-dimensional array sensor 303 and the image (sequence) obtained is recorded on the signal recording medium 306 in the same manner as in the foregoing embodiment.

2. The recorded image (sequence) is read out by the image reproducing unit 307.

Figure 14:
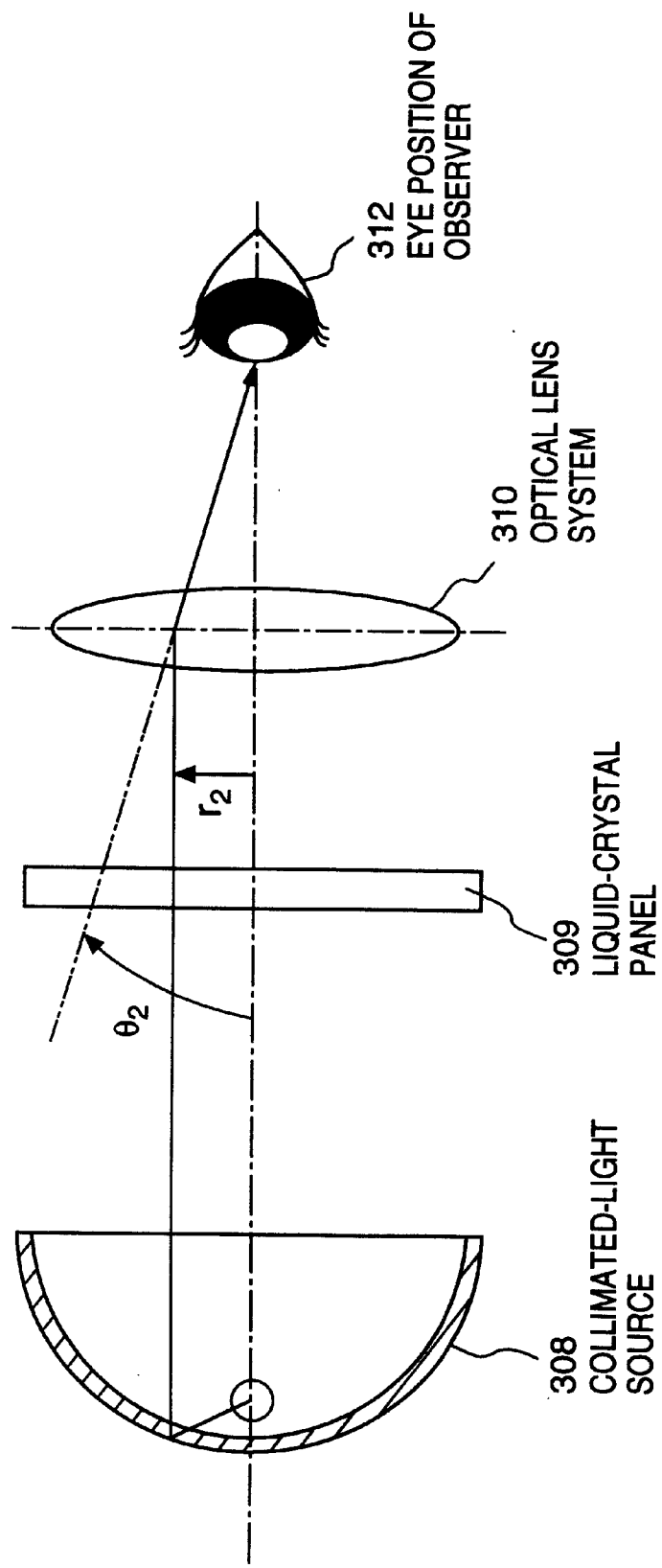
FIG. 14 is a diagram for describing the display of FIG. 13.

3. The optical lens system 310 is so adapted that a pixel of the liquid-crystal panel 309 at a distance $r_2$ from the optic axis will reside at a position at which the angle of incidence is $\theta_2$ as seen from an observer 312. In this case, $r_2$ and $\theta_2$ satisfy the relation of the fisheye lens 301 described above (see FIG. 14). Thus, video over a viewing angle of 180°} can be obtained from an image represented by a limited two-dimensional planar area, namely the liquid-crystal panel 309. In other words, the distortion of the image sensed by the image sensing system of the fisheye lens is converted to a hemispherical image by the lens of the display system.

[Sixth Embodiment]

Figure 15:
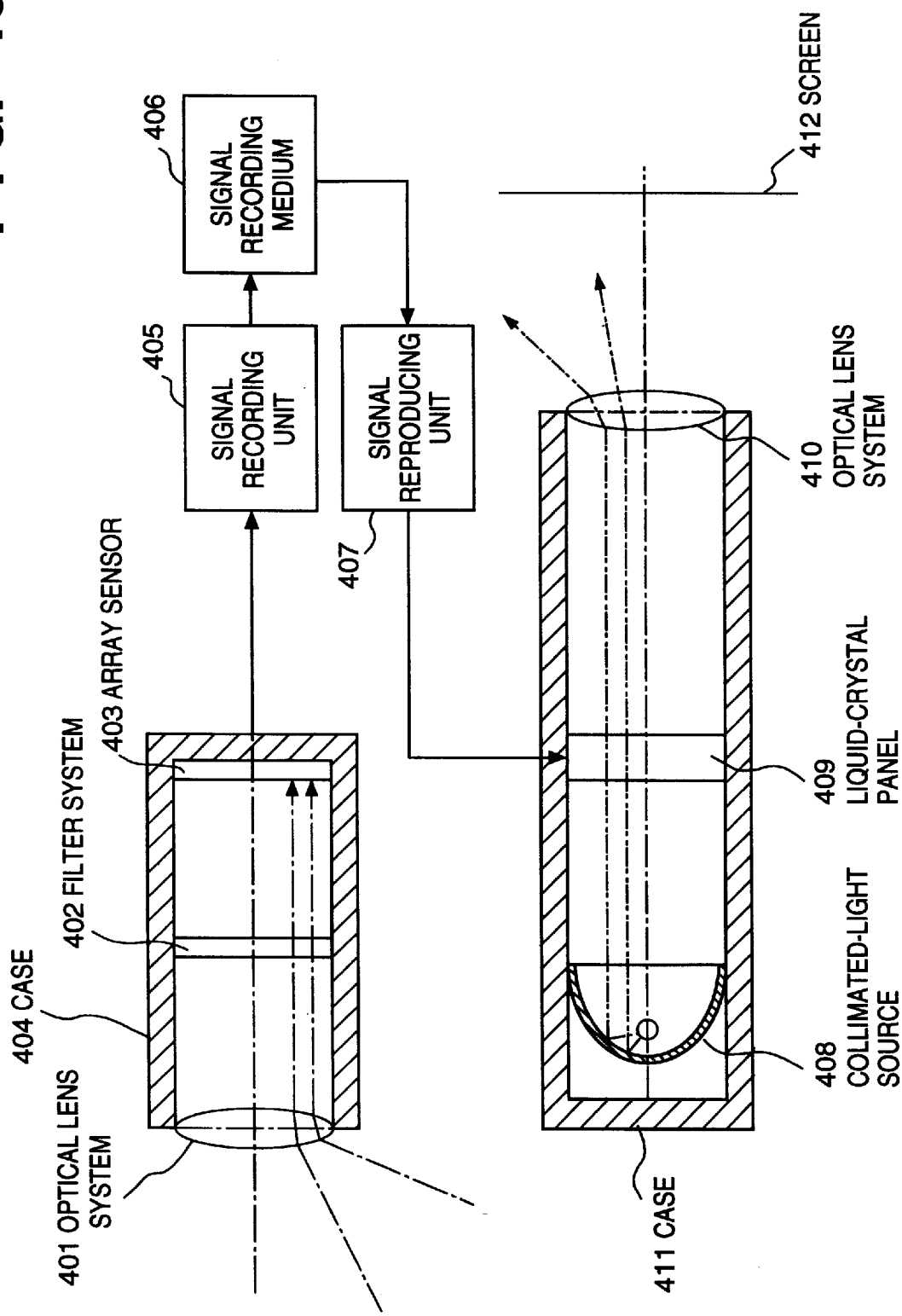
FIG. 15 is a diagram showing an example of the construction of an image display unit according to the sixth embodiment.

FIG. 15 is a diagram illustrating another embodiment. Here the display system is of the projector type, in which an image is projected on a screen. Numeral 401 denotes an optical lens system, 402 a filter system, 403 a two-dimensional array sensor, 404 a case, 405 a signal recording unit, 406 a signal recording medium, 407 a signal reproducing unit, 408 a collimated-light source and 409 a liquid-crystal panel, which are identical with those of the fourth embodiment. Further, numeral 410 denotes an optical lens system, and 411 represents a case for fixing the collimated-light source 408, liquid-crystal panel 409 and optical lens system 410 in the positional relationship illustrated. Numeral 412 denotes a front-projection-type screen.

The operation of this arrangement will now be described. Since the operation of the image sensing part has been described, as in the case of the fourth and fifth embodiments, the description will be rendered with regard to the display part.

1. Though distorted by the fisheye lens 401, the image sensed over a wide angle is sampled by the two-dimensional array sensor 403 and the image (string) obtained is recorded on the signal recording medium 406.

2. The recording image (string) is read out by the image reproducing unit 307.

Figure 16:
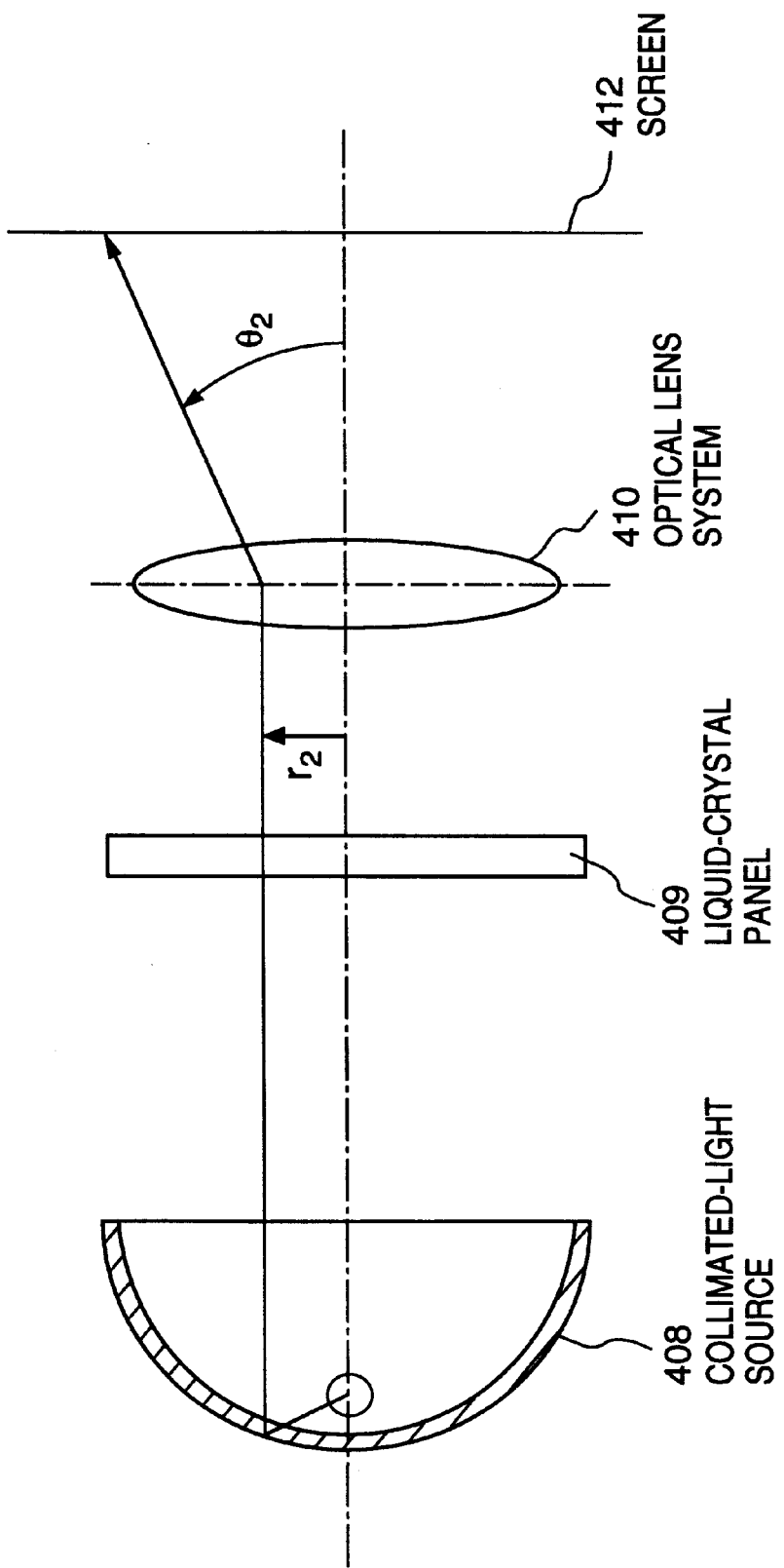
FIG. 16 is a diagram for describing the display of FIG. 15 and FIG. 7.

3. The optical lens system 410 is so adapted that a light ray that has passed through a pixel of the liquid-crystal panel 409 at a distance $r_2$ from the optic axis will be projected at an angle $\theta_2$. In this case, $r_2$ and $\theta_2$ satisfy the relation of the fisheye lens 401 described above (see FIG. 16).

Thus, video over a viewing angle of 180°} can be obtained from an image represented by a limited two-dimensional planar area, namely the liquid-crystal panel 309.

[Seventh Embodiment]

Figure 17:
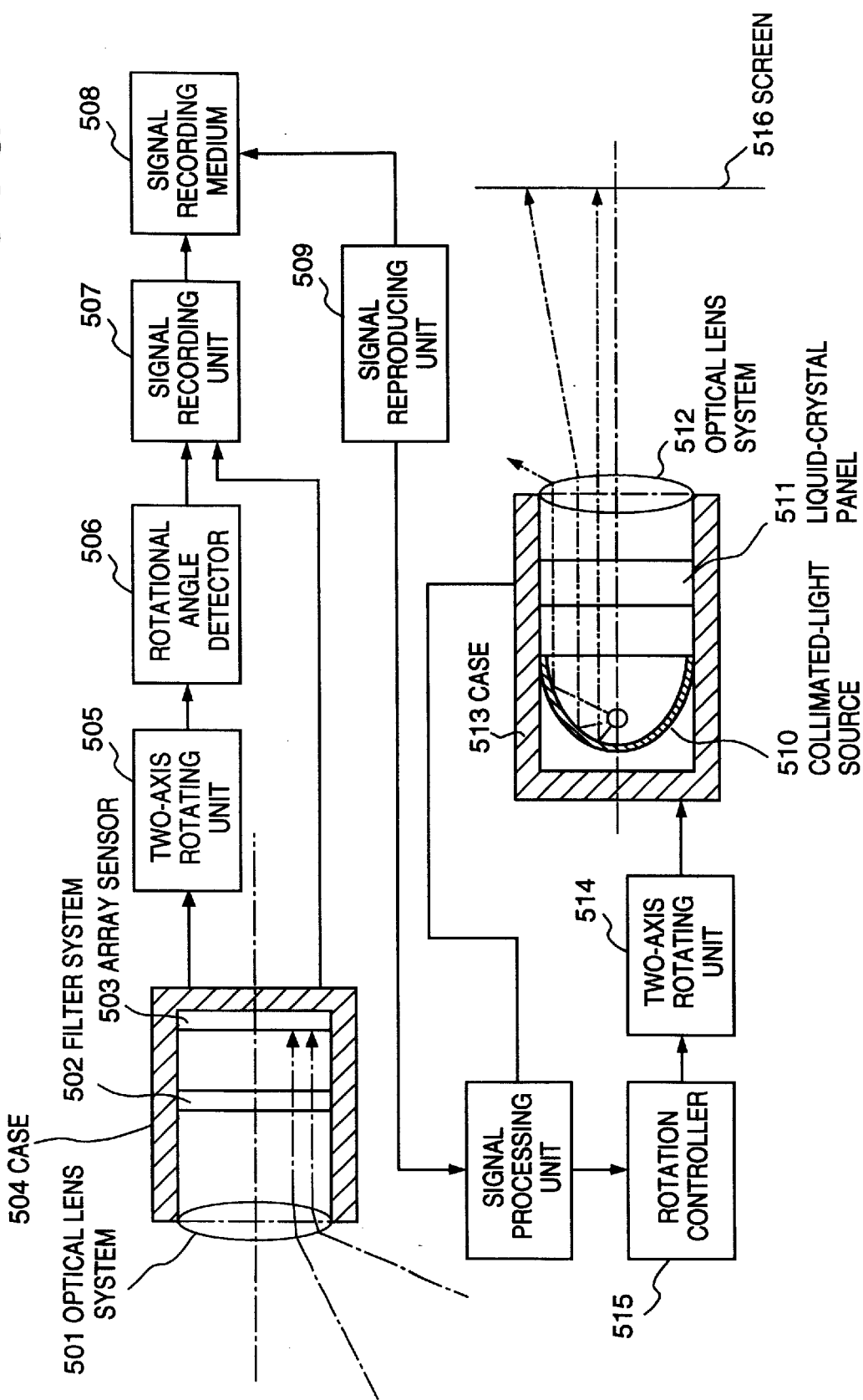
FIG. 17 is a diagram showing an example of the construction of an image display unit according to the seventh embodiment.

FIG. 17 is a diagram illustrating another embodiment. According to this embodiment, high-resolution portions over a wide viewing angle can be changed by making it possible to rotate both the image sensing unit and the display unit about two axes. Numeral 501 denotes an optical lens system, 502 a filter system, 503 a two-dimensional array sensor and 504 a case, which are identical with those of the fourth embodiment. Numeral 505 denotes a two-axis rotation device which makes it possible to rotate the case 504 about two axes, i.e., to perform image sensing over any viewing angle. Numeral 506 denotes a rotational-angle detector for detecting the angle of rotation of the case 504. Numeral 507 denotes a signal recording unit, 508 a signal recording medium, 509 a signal reproducing unit, 510 a collimated-light source and 511 a liquid-crystal panel, which are identical with those of the fourth embodiment. Numeral 512 denotes an optical lens system and 513 a case, which are identical with those of the sixth embodiment. Numeral 514 denotes a two-axis rotation device which makes it possible to rotate the case 514 about two axes. Numeral 515 denotes a rotation controller for controlling the angle of rotation of the case 513. Numeral 516 denotes a screen the same as that of the sixth embodiment. Numeral 517 denotes a signal processing unit for controlling the display unit based upon a signal from the signal reproducing unit 509.

The operation of this arrangement will now be described. The image sensing side will be discussed first.

1. The image signal sampled by the two-dimensional array sensor 503 and the signal, which represents the angle of rotation of the optic axis of the image sensing system, detected by the rotational-angle detector 506 are obtained on the image sensing side.

2. These signals are encoded by a suitable encoding system and are recorded on the signal recording medium 508 by the signal recording unit 507.

The display side will be described next.

1. The image distorted by the fisheye lens 501 is sampled by the two-dimensional array sensor 503 and the image (sequence) obtained is recorded on the signal recording medium 508. The signal representing the angle of rotation of the optic axis also is recorded on the recording medium 508.

2. The recorded image (sequence) and the rotational-angle signal are read out by the signal reproducing unit 509.

3. The optical lens system 512 is so adapted that a light ray that has passed through a pixel of the liquid-crystal panel 511 at a distance $r_2$ from the optic axis will be projected at an angle $\theta_2$. In this case, $r_2$ and $\theta_2$ satisfy the relation of the fisheye lens 501 described above (see FIG. 16).

4. The rotation controller 515 rotates the case 513 via the two-axis rotation unit 514 based upon the rotational-angle signal read out.

Thus, according to the seventh embodiment, an area displayed at a high resolution can be changed dynamically.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A visual information process apparatus, comprising:
   image input means which includes a wide-angle lens and an array sensor;
   input-parameter control means for controlling an input parameter of said image input means;
   memory means for storing image information that enters from said image input means;
   calculating means for calculating an input-parameter control value based on a position of an image formed by an object and corresponding index of a sensor of said array sensor using a coordinate transformation equation; and
   control means for controlling a timing at which an image information from said image input means is recorded in said memory means and another timing at which the input parameter is applied to control said image input means.

2. The apparatus according to claim 1, further comprising two-dimensional filter means for subjecting an output image from said array sensor to more than one stage of filtering.

3. The apparatus according to claim 2, further comprising:

extremum detecting means for detecting an extremum of a two-dimensional signal outputted by said array sensor or two-dimensional filter means; and extremum memory means for storing coordinates of the detected extremal.

4. An image input apparatus comprising:

(a) a lens system having an optic axis;

(b) an array sensor;

(c) a buffer for storing image data outputted by said array sensor; and (d) control means comprising:

(d-1) feature detecting means for detecting a feature point in an image from the image data that have been read out of said array sensor and stored in said buffer;

(d-2) recognition means for recognizing a varied portion in an image based upon a change of feature points detected by said feature detecting means, wherein said recognition means uses a coordinate transformation equation for calculating a feature control value;

(d-3) optic axis control means for controlling the optic axis of said lens system based upon a position of an image formed by an object and corresponding index of a sensor of said array sensor calculated by said recognition means, (d-4) wherein said control means controls said optic axis control means and said array sensor based upon an output of said recognition means, thereby performing control so as to selectively sense the varied portion in an image.

5. The apparatus according to claim 4, wherein said control means has a plurality of status bits and elements constituting the apparatus are controlled by these status bits.

6. The apparatus according to claim 5, further comprising image data restoration means for restoring an image that has been stored in said buffer.

7. The apparatus according to claim 4, wherein said lens system includes a fisheye lens.

\* \* \* \* \*

UNITED STATES PATENT AND TRADEMARK OFFICE
CERTIFICATE OF CORRECTION

PATENT NO.     : 6,493,031 B1
DATED          : December 10, 2002
INVENTOR(S)    : Teruyoshi Washizawa It is certified that error appears in the above-identified patent and that said Letters Patent is hereby corrected as shown below:

<u>Title page,</u>
Item [56], References Cited, U.S. PATENT DOCUMENTS, please delete second occurrence of the following:
"EP      0 458373 A      11/91
 EP      0 637168        2/1995"

<u>Column 6,</u>
Line 48, "CPU 15 a controls" should read -- CPU 15a controls --

<u>Column 12,</u>
Line 66, "bits 107 109 are" should read -- bits 107 ~109 are --

Signed and Sealed this

Sixth Day of January, 2004

JAMES E. ROGAN
*Director of the United States Patent and Trademark Office*